(12) United States Patent
Velkavrh et al.

(10) Patent No.: US 12,411,024 B2
(45) Date of Patent: Sep. 9, 2025

(54) METHOD, APPARATUS, AND SYSTEM FOR PROVIDING MOCK MAP DATA FOR MAP DESIGN VALIDATION AND DOCUMENTATION

(71) Applicant: HERE Global B.V., Eindhoven (NL)

(72) Inventors: Urban Velkavrh, Berlin (DE); Beatrix Fey, Berlin (DE)

(73) Assignee: HERE Global B.V., Eindhoven (NL)

( * ) Notice: Subject to any disclaimer, the term of this patent is extended or adjusted under 35 U.S.C. 154(b) by 30 days.

(21) Appl. No.: 17/537,030

(22) Filed: Nov. 29, 2021

(65) Prior Publication Data

US 2023/0168106 A1 Jun. 1, 2023

(51) Int. Cl.
*G01C 21/00* (2006.01)

(52) U.S. Cl.
CPC ....... *G01C 21/387* (2020.08); *G01C 21/3807* (2020.08); *G01C 21/3833* (2020.08)

(58) Field of Classification Search
CPC .............. G01C 21/387; G01C 21/3807; G01C 21/3833
See application file for complete search history.

(56) References Cited

U.S. PATENT DOCUMENTS

| | | | | |
|---|---|---|---|---|
| 8,359,156 | B2 * | 1/2013 | Guo | G01C 21/3819 701/411 |
| 9,286,021 | B2 | 3/2016 | Appleton et al. | |
| 10,991,077 | B2 | 4/2021 | Snowden et al. | |
| 2013/0346855 | A1 | 12/2013 | Appleton et al. | |
| 2014/0340421 | A1 * | 11/2014 | Otero | G01C 21/367 345/619 |
| 2015/0130817 | A1 | 5/2015 | Appleton et al. | |
| 2017/0108347 | A1 * | 4/2017 | Zhu | G01C 21/3881 |
| 2017/0301118 | A1 * | 10/2017 | Lanza | G06F 3/04845 |

(Continued)

FOREIGN PATENT DOCUMENTS

| | | | | |
|---|---|---|---|---|
| AU | 2012316226 A1 * | 4/2014 | ......... | G01C 21/3667 |
| AU | 2012316227 A1 * | 4/2014 | ............. | G01C 21/32 |

(Continued)

OTHER PUBLICATIONS

English Translation for JP-2017032654-A (Year: 2017).*

(Continued)

*Primary Examiner* — Faris S Almatrahi
*Assistant Examiner* — Moises Gasca Alva
(74) *Attorney, Agent, or Firm* — DITTHAVONG, STEINER & MLOTKOWSKI

(57) ABSTRACT

An approach is provided for mock map data for map design validation. For example, the approach involves calculating one or more combinations of one or more map feature attributes, one or more map feature attribute values, or a combination thereof. The approach also involves creating one or more geometric features respectively for the one or more combinations. The approach further involves determining an arrangement of the one or more geometric features within a designated geographic area. The approach further involves generating mock map data based on the arrangement and providing the mock map data to a map client. The map client, for instance, renders the mock map data in a map image based on a map style taxonomy.

19 Claims, 17 Drawing Sheets

MAP IMAGE 201

(56) References Cited

U.S. PATENT DOCUMENTS

| | | | | |
|---|---|---|---|---|
| 2018/0181576 A1* | 6/2018 | Hansen | ................ | G06F 16/444 |
| 2019/0371052 A1* | 12/2019 | Kehl | ...................... | G06T 7/521 |
| 2020/0394753 A1* | 12/2020 | Brown | ............... | G01C 21/3804 |

FOREIGN PATENT DOCUMENTS

| | | | | |
|---|---|---|---|---|
| JP | 4486175 B2 * | 6/2010 | ......... | G01C 21/3638 |
| JP | 2017032654 A * | 2/2017 | | |

OTHER PUBLICATIONS

Interactive Urban Map Design with Template and Parameterization, Xiaofei Dou (Year: 2009).*

Yoav I H Parish, "Procedural Modeling of Cities", 2001 (Year: 2001).*

Liapis A. Yannakakis, "Sentient World: Human-Based Procedural Cartography", 2013, 180-191 (Year: 2013).*

Guoning Chen etc . . . , Interactive procedural street modeling, Aug. 2008 (Year: 2008).*

Slaughter, "Building a Map Taxonomy Chart", retrieved from https://blog.mapbox.com/map-design-taxonomy-chart-ae17b23df019, Apr. 3, 2018, 5 pages.

Velkavrh, "Mock Vector Tiles Server (MVTS)", Here Gerrit Code Review (gerrit.it.here.com), README.md, May 10, 2021, 6 pages.

* cited by examiner

METHOD, APPARATUS, AND SYSTEM FOR PROVIDING MOCK MAP DATA FOR MAP DESIGN VALIDATION AND DOCUMENTATION

BACKGROUND

Mapping, navigation, and other similar location-based applications and services use map rendering to transform digital map data into a map image for display on a client device. As part of this process, cartography design teams assign appearance styles to map features based on the feature type/attribute (e.g., types of roads, points of interest, cities, etc.) and feature attribute values (e.g., size/class of roads, points of interest, cities, etc.). However, the possible combinations of different appearances of the features quickly increase as the number of map features and appearance options increase. As a result, mapping service providers face significant technical challenges to observing and validating changes to map styles to ensure readability, design aesthetics, etc. across the possible combinations of map features (e.g., 1,000 or more different possible combinations).

SOME EXAMPLE EMBODIMENTS

Therefore, there is a need for providing mock map data that include procedurally generated map feature attributes and attribute within a relatively small area (e.g., within an area of a traditional map tile or combination of map tiles) for map design validation and/or documentation.

According to one embodiment, a method comprises calculating one or more combinations of one or more map feature attributes, one or more map feature attribute values, or a combination thereof. The method also comprises creating one or more geometric features respectively for the one or more combinations. The method further comprises determining an arrangement of the one or more geometric features within a designated geographic area (e.g., area of a map tile). The method further comprises generating mock map data based on the arrangement. The method further comprises providing the mock map data to a map client. In one embodiment, the map client renders the mock map data in a map image based on a map style taxonomy.

According to another embodiment, an apparatus comprises at least one processor, and at least one memory including computer program code for one or more computer programs, the at least one memory and the computer program code configured to, with the at least one processor, cause, at least in part, the apparatus to calculate one or more combinations of one or more map feature attributes, one or more map feature attribute values, or a combination thereof. The apparatus is also caused to create one or more geometric features respectively for the one or more combinations. The apparatus is further caused to determine an arrangement of the one or more geometric features within a designated geographic area (e.g., area of a map tile). The apparatus is further caused to generate mock map data based on the arrangement. The apparatus is further caused to provide the mock map data to a map client. In one embodiment, the map client renders the mock map data in a map image based on a map style taxonomy.

According to another embodiment, a non-transitory computer-readable storage medium carries one or more sequences of one or more instructions which, when executed by one or more processors, cause, at least in part, an apparatus to calculate one or more combinations of one or more map feature attributes, one or more map feature attribute values, or a combination thereof. The apparatus is also caused to create one or more geometric features respectively for the one or more combinations. The apparatus is further caused to determine an arrangement of the one or more geometric features within a designated geographic area (e.g., area of a map tile). The apparatus is further caused to generate mock map data based on the arrangement. The apparatus is further caused to provide the mock map data to a map client. In one embodiment, the map client renders the mock map data in a map image based on a map style taxonomy.

Also, according to another embodiment, a computer program product may be provided. For example, a computer program product comprising instructions which, when the program is executed by a computer, cause the computer to carry out the steps described herein.

According to another embodiment, an apparatus comprises means for calculating one or more combinations of one or more map feature attributes, one or more map feature attribute values, or a combination thereof. The apparatus also comprises means for creating one or more geometric features respectively for the one or more combinations. The apparatus further comprises means for determining an arrangement of the one or more geometric features within a designated geographic area (e.g., area of a map tile). The apparatus further comprises means for generating mock map data based on the arrangement. The apparatus further comprises means for providing the mock map data to a map client. In one embodiment, the map client renders the mock map data in a map image based on a map style taxonomy.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing mock map data for map design validation and document are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although the various embodiments are discussed with respect to a mapping or geographic database as one example of a structured database, it is contemplated that the embodiments described herein are applicable to any structured database that is to be streamed to user devices.

Figure 1:
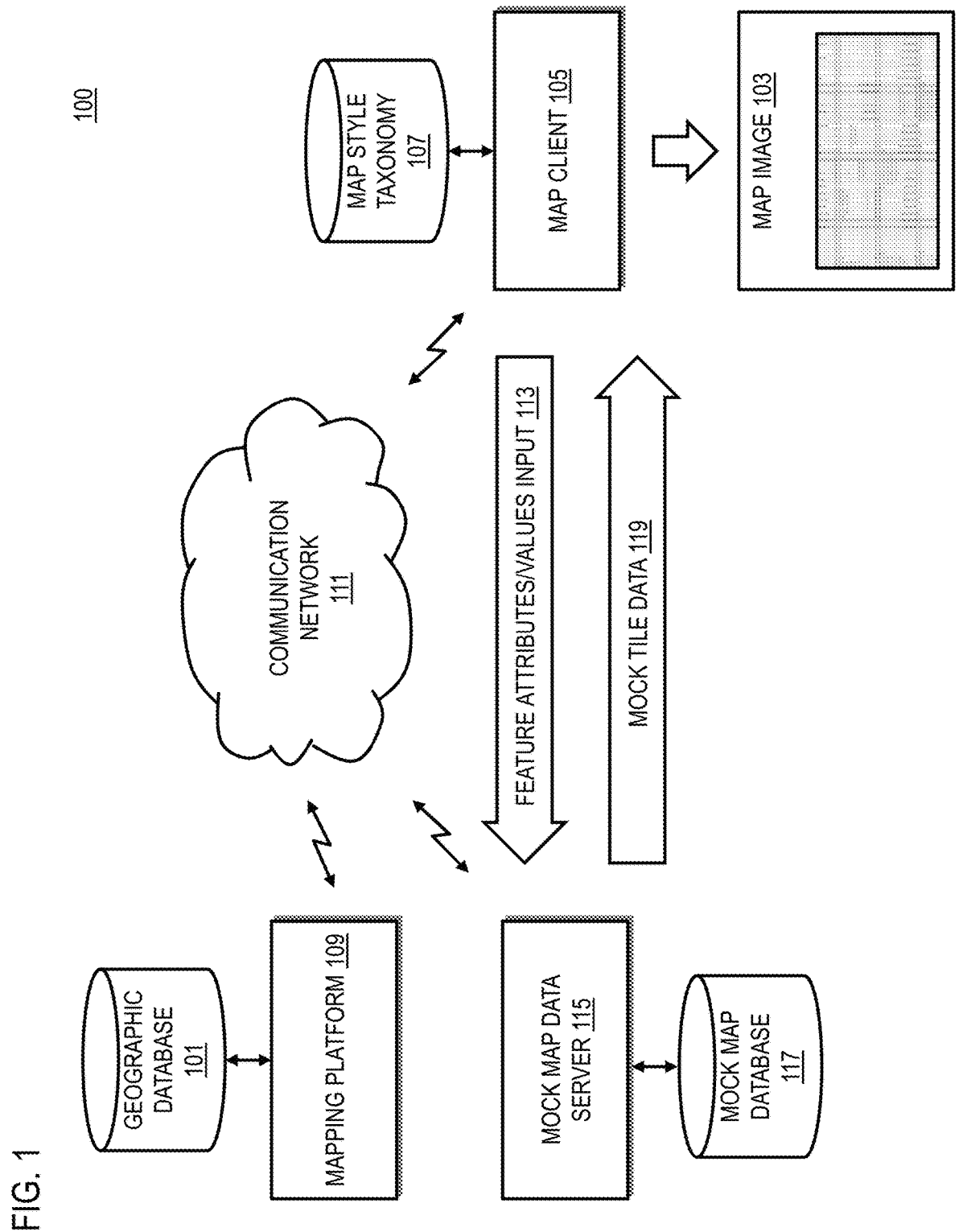
FIG. 1 is a diagram of a system capable of providing mock map data for map design validation and document, according to one embodiment.

FIG. 1 is a diagram of a system capable of providing mock map data for map design validation and document, according to one embodiment. As noted above, in one embodiment, map rendering is a process where source map data (e.g., vector map data of a geographic database 101) is transformed into a bitmap image of a map (e.g., map image 103). By way of example, the source map data of the geographic database 101 is typically represented in form of vector tiles or equivalent representation. A vector tile contains cartographic or map features (e.g., roads, points of interest (POIs), political boundaries, terrain features, etc.) located within a geographic area represented by a given map tile at varying zoom levels. Each cartographic or map feature has an associated geometry, e.g., can be point, line, area, volume, etc. and a set of attributes.

In one embodiment, a cartography design team (e.g., design experts or a team of experts) can style the rendered appearance of the map (e.g., as rendered in the map image 103 by a map client 105) by assigning appearance or visual attributes (e.g., line width, color, outline, cap style, font properties, zoom level display, symbol, textures, shapes, etc.) to cartographic/map features based on the feature type and feature attribute values (e.g., functional class of a road, population of city, use of an urban area, etc.). The style, for instance, can be stored in a map style taxonomy 107 or equivalent data store that record the assigned stylistics rules with the corresponding cartographic/map features. Generally, the number of different appearances, styled based on feature attributes, can be very large. For example, streets stored in the geographic database 101 according to in a default or typical scheme can have more than 1,000 possible different appearances—e.g., based on all possible combinations of line widths, colors, outlines, cap styles, font properties, zoom level displays, etc. which are selected based on feature attributes such as road functional class, feature type (e.g., tunnel, bridge, etc.), surface type, and/or any other related attributes (e.g., under-construction, closed, etc.).

Historically, map styling has been an interactive process that involves, for instance, changing the style or appearance of a map and then observing results using real map data. For example, if the size of a font for labeling a city with a population over 1,000,000 residents is changed, then a real-world city that meets this characteristic would have to be found in the real-world map data (e.g., by querying the geographic database 101 via a mapping platform 109). The corresponding map tile from the geographic database 101 in which the test city would then be served over a communication network 111 from the mapping platform 109 to the map client 105 to be rendered according to the updated style (e.g., updated map style taxonomy 107). The resulting rendered map image can then be inspected to determine the effect of the style change. However, when multiple style changes or made of if multiple interactions of the changed style with existing styled features is to be evaluated, it may be not possible to see all the possible combinations of the feature appearances and their interactions in one real-world place—as the features can be scattered around the world such that all desired test features are not co-located within the same map tile. Sometimes, the feature attributes are newly created and are not available in the existing real-word map data yet.

In one example, test map data which includes all possible combinations of feature attributes can be drawn and attributed manually in a map editor. Such custom map source can be than used instead of normal base map vector tiles to style the map. However, the fact that map is manually edited makes it very difficult to modify and extend: a single new attribute, e.g., may require all the entries in the manually edited map data to be duplicated and amended with new attribute values, and that is an exponential amount of manual work for every new attribute. Styling also considers map scale, so the same data would have to be repeated at different scales or map zoom levels.

In yet another example, a taxonomy chart can be created in design tools to visualize all the possible feature combinations. However, since there is historically no automated tool to generate the taxonomy chart from map styling descriptions, the process of creating a taxonomy chart must be done manually, which means it is prone to mistakes, and very labor intensive to maintain. Therefore, it cannot be used as a basis for interactive styling.

To address these technical challenges, the system 100 of FIG. 1 introduces a capability to let a user specify a set of possible feature attributes and attribute values (e.g., all or a subset of available feature attributes and/or attribute values). Based on the input (e.g., feature attributes/values 113), possible combinations of attribute values are calculated (e.g., by a mock map data server 115). For each combination, a new geometric feature is procedurally created as, for instance, mock tile data 117. The mock tile data 117 can be procedurally generated on demand, and/or stored or cached in a mock map database 119 for later use or re-use. In one embodiment, the mock tile data 117 can be stored in the mock map database 119 for map style taxonomy document at different points in time. As used herein, the term "procedurally generated" refers to synthetically generating map data based on the feature attributes/values 113 using one or more preconfigured rules to automatically arrange the geometric features representing the feature attributes and values specified in the feature attributes/values input 113 over a specified geographic area (e.g., a map tile or multiple map tiles depending on the requested scale and/or density of the features. In one embodiment, the features are arranged in geometrical patterns (e.g., regular grids, columns, rows, strips, concentric circles, etc.) so that all combinations and intersections can be viewed in a compact area. The geometrical patterns generally result in intersecting arrangements of all combinations of the features (e.g., intersecting grid patterns). This, in turn, enables a user to quickly view the corresponding styled representations of the intersecting features in a compact area to document and/or validate whether the representations are visually compatible (e.g., do not blend in with each, remain visually distinct, create a pleasing color combination, etc.). The mock tile data 117 of the mock map database 119 with procedural geometry can be generated for all the locations in the world, and/or for all the zoom levels (or for specific locations or zoom levels specified by the user).

In one embodiment, the procedural generator (e.g., the mock map data server 115) can act as map data server (e.g., a vector tile server), so any client that supports the mock tile data 117 of the mock map database 119 can connect to the server 115 and render corresponding map images 103 (e.g., bitmap images) from the mock tile data 117. By way of example, the mock map database 119 and the mock tile data 117 can be provided using any known or equivalent vector tile format (e.g., Mapbox Vector Tile (MVT), Optimized Map for Visualization (OMV), or equivalent). Accordingly, any compatible map client 105 (e.g., consumer application of vector maps) can connect to the mock map data sever 115 to receive and render the mock tile data 117 (e.g., rendered based on the map style taxonomy 107). Examples of compatible map clients 105 include any vector-based map renderer such as, but are not limited to: HARP (HERE Advanced Rendering Platform) native, harp.gl, MapLab, MapBox, Tangram Rendering Engine or equivalent.

According to the various embodiments, the system 100 is capable of procedurally generating combinations of available feature attributes and view the styled results as any other map (e.g., map image 103) in any map editor or map client 105. In addition, new attributes can easily be added or removed even if those attributes are not yet present in the available real-world map data (e.g., the geographic database 101).

Figure 2A:
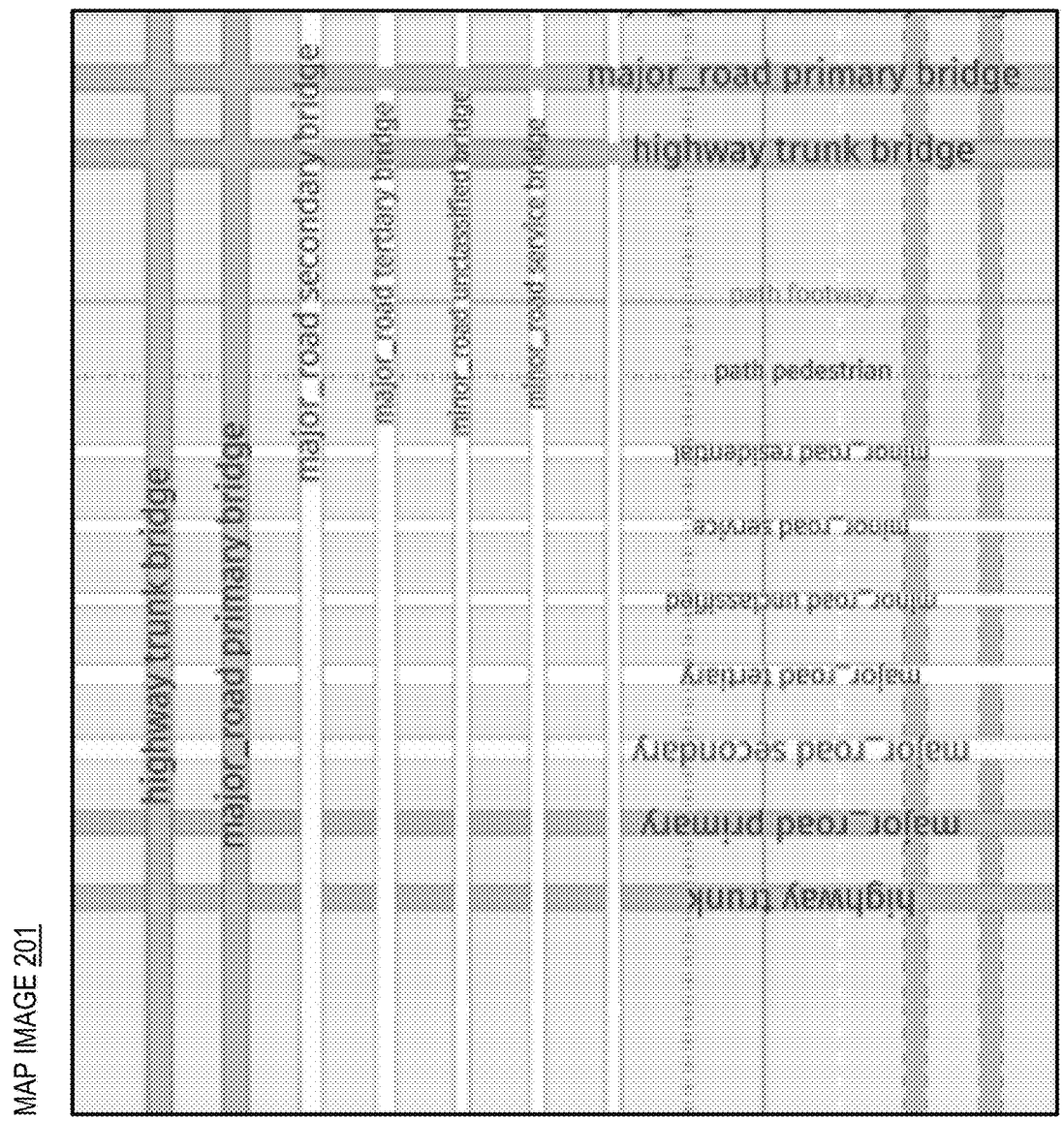
FIGS. 2A-2C are diagrams of example rendered map images based on mock map data, according to one embodiment.
Figure 2B:
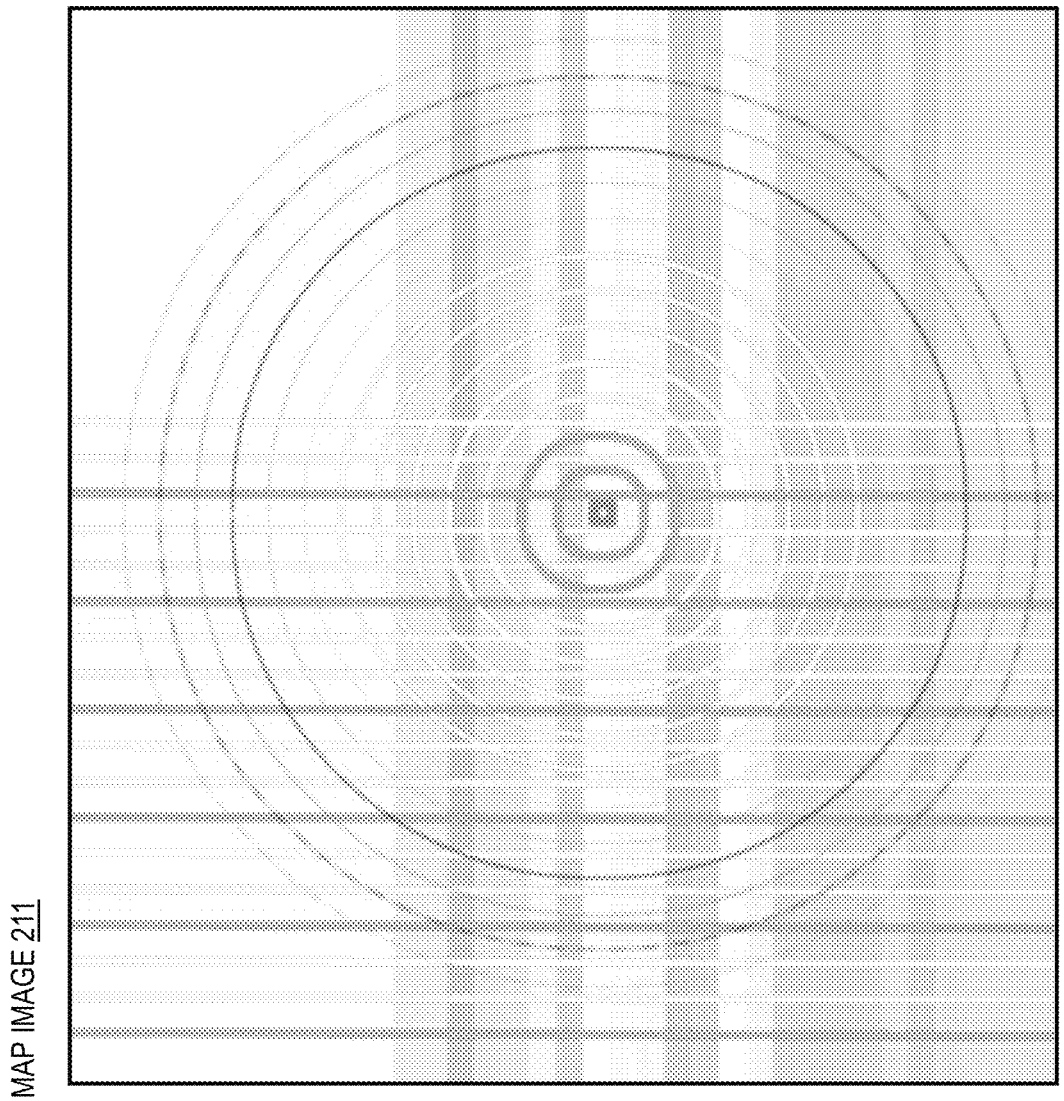
Figure 2C:
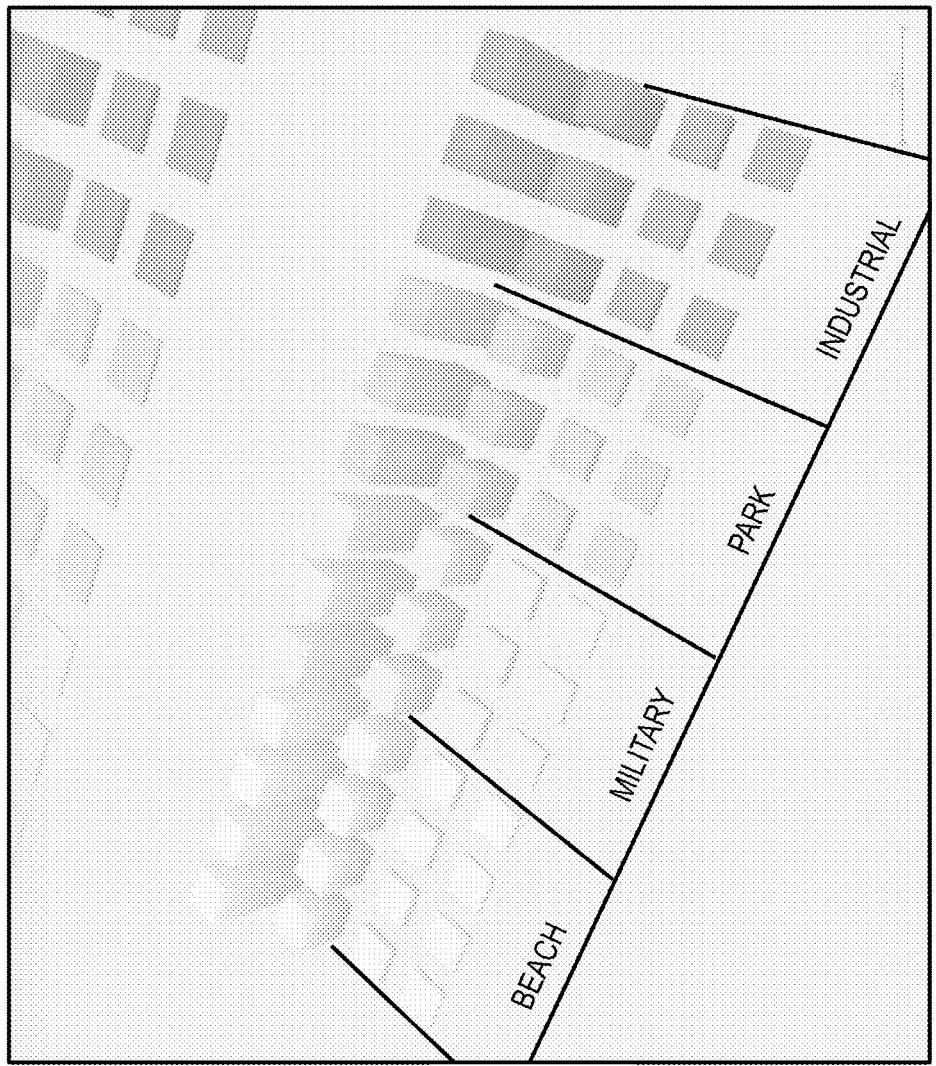

FIGS. 2A-2C are diagrams of example rendered map images based on mock map data, according to one embodiment. In example map image 201 of FIG. 2A, the map client 105 has rendered a map image 201 of mock tile data 117 using a specified map style taxonomy 107. The mock tile data 117 has been procedurally generated to include road features of varying attribute values (e.g., highway trunk, major primary road, major secondary road, major tertiary road, minor unclassified road, minor service road, minor residential road, pedestrian path, and footway path) against bridge features of varying attributes (e.g., highway trunk bridge, major primary road bridge, major secondary road bridge, major tertiary road bridge, minor unclassified road bridge, and minor service road bridge). The mock map data server 115 has arranged the road features of varying attributes as equally spaced vertical lines in a grid arrangement with the bridge features of varying attributes as equally spaced horizontal lines. The mock tile data 117 thus includes all possible intersection combinations of the road attributes and the bridge attributes so that the map image 201 can document and visually present the combinations based on the selected style taxonomy 107.

Once rendered as the map image 201, the styled combinations (e.g., intersections of roads and bridges) can be visually documented and/or validated to determine whether a designer should change any to the styles to improve or alter the rendered appearance of the features. As a result, the designer or user need not search the real-world map data of the geographic database 101 for locations that where such intersections may occur, but instead can view a compact concentration of the procedurally generated intersection combinations for improved validation and document. Because the mock tile data 117 is generated in a standard format supported by general map clients 115, the map image 201 can be generated by the map client 105 without needing to be customized or modified (e.g., other than being able to be redirected to receive tile data from the mock map data server 115 instead of a non-mock tile server (e.g., the mapping platform 109 serving real world tiles from the geographic database 101). This can also provide for interactivity with the mock tile data 117 using native functions of the map client 105 such as, but not limited, to changing map zoom levels, panning, etc. In one embodiment, the rendered map image 201 can serve as the equivalent of a map style taxonomy chart to document a created map style taxonomy 107 with the technical advantage that the map image 201 can be generated automatically without manual intervention unlike a traditional style taxonomy chart. For example, the rendered map image 201 can be exported to different file formats (e.g., PDF, JPG, TIFF, DOCX, PPTX, etc.) for creating a map style taxonomy document.

It is noted that the grid arrangement of FIG. 2A is provided by way of illustration and not as a limitation. It is contemplated that the mock tile data 117 can be generated to present road features and/or any other map features available in the mock map database 119 and/or geographic database 101 according to any type of arrangement or pattern. FIG. 2B illustrates an example map image 211 that is a rendering of mock tile data 117 in which the road features are procedurally arranged in a concentric circular arrangement. More specifically, the concentric circular road features are overlaid on a vertically spaced arrangement of other road features. This arrangement is then further overlaid on horizontally arranged geographic areas with different land use categories (e.g., indicated by different horizontal bands with different shading—with each shade corresponding to a different land use category). By using different arrangements of features (e.g., circular versus grid—or another other arrangement), a map designer can view, validate, and/or document map style taxonomies across different possible geographic scenarios.

FIG. 2C illustrates an example map image 221 that is rendered in three-dimensions, according to another embodiment. In the example of FIG. 2C, a user has selected the feature attributes/values of buildings of varying heights to be combined with land use of varying categories (e.g., beach, military, park, industrial). The mock map data server 115 generates mock tile data 117 that arranges vector representations of buildings from tallest to shortest building in a vertical line that repeat as horizontally. The buildings are placed on different land use areas arranged horizontally underneath the buildings from "BEACH" to "MILITARY" to "PARK" to "INDUSTRIAL." The visual appearance of the buildings and land use areas can be individually style (e.g., different 3D heights for building models, different land use color/shading for each land use). The arrangement is encoded in standard vector tile format as mock tile data 117 and sent to the map client 105 for rendering using a selected map style taxonomy 107. As with the example of FIG. 2A, the procedurally generated mock tile data 117 used to render the map image 211 can depict buildings and land use areas that do not occur in the real-world map data of the geographic database 101. This enables a designer to document and validate the styled features using the map image 211 in an automated way that would otherwise require extensive manual map editing or taxonomy chart creation.

The various embodiments of procedurally generating mock map data for map design validation and/or document provide for several use causes including but not limited to the following:

For a cartographer/designer/style editor user case, the various embodiments enable a user to:
  create a map style concept (e.g., map style taxonomy 107);
  validate the created style for completeness and sanity check; and
  visually document the created map style in one view.
This use case is possible through:
  A visual overview of every selected map object (e.g., cartographic or map feature) and their attributes (and combinations thereof) in a rendered map image 103 that the user can customize (e.g., by specifying different visual characteristics such as, but not limited to, area, line, point, volumes, labels, icons, etc.).
  The ability to relate visual variables selected by the user for the map objects in relation to each other in one view (e.g., visual variables such as, but not limited to, size, color, hue saturation value (HSV), shape, texture, etc.).
  The ability to add new map features to the style taxonomy even if the new map features do not currently exist in current real-world map data.

Figure 3:
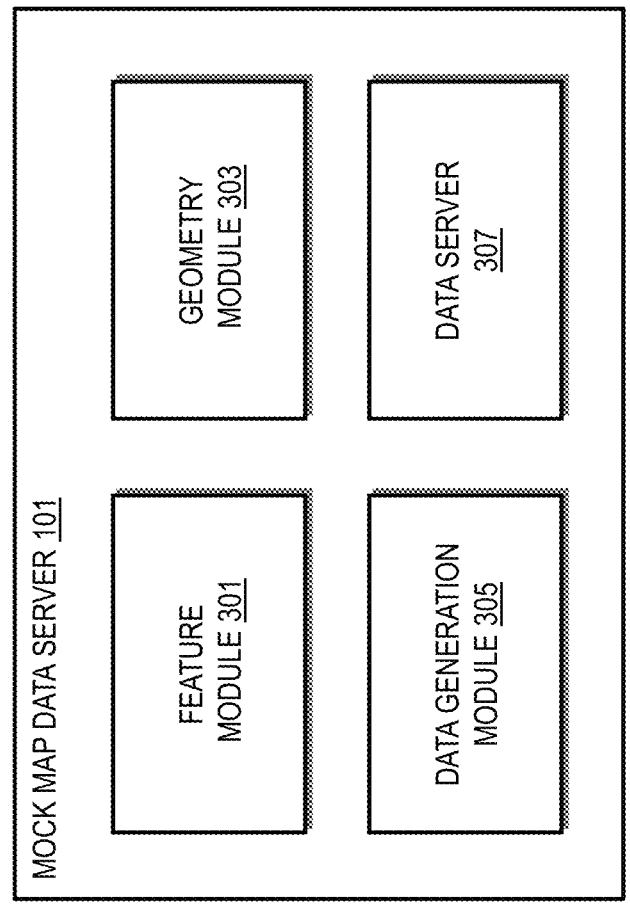
FIG. 3 is a diagram of the components of a mock map data server, according to one embodiment.

FIG. 3 is a diagram of the components of a mock map data server, according to one embodiment. In one embodiment, as shown in FIG. 3, the mock map data server 115 of the system 100 includes one or more components for providing mock map data for map design validation and documentation according to the various embodiments described herein. It is contemplated that the functions of the components of the mock map data server 115 may be combined or performed by other components of equivalent functionality. As shown, in one embodiment, the mock map data server 115 includes the following components:

A feature module 301 to generate possible combinations of cartographic/map feature attributes and attribute values (e.g., the feature attributes and attribute values can be selected by a user or by any other process);
  A geometry module 303 to generate geometric features based on the combination of features attributes/values and arrange the geometric features in different patterns/arrangements inside a designated geographic area (e.g., a map tile or multiple tiles in case the number of features is too big for a single tile);
  A data generation module 305 (e.g., vector module) to create map data based on the arranged geometric that is compatible with the data accepted by a target map client 105 (e.g., a wrapper around MVT specification protobuffer generated file (or equivalent vector format such as but not limited to OMV), which enables the procedural creation of mock tile data 117 as compatible vector tiles (e.g., MVT or other format compatible tiles) comprising points, lines, and areas with an arbitrary set of attributes to the tile and at one or more arbitrary map zoom levels, locations, etc.; and
  A data server 307 (e.g., an output module) which can be a HTTP server (or equivalent) that servers the procedurally generated mock tile data 117 to any compatible and connected map client 105 (e.g., map clients 105 supporting MVT, OMV, etc. map tiles).

The above presented modules and components of the mock map data server 115 can be implemented in hardware, firmware, software, or a combination thereof. For example, in one embodiment, the mock map data server 115 and/or any of its components can be implemented as a set of Python modules with functions to procedurally generate and serve mock map data to compatible map clients 105.

Though depicted as a separate entity in FIG. 1, it is contemplated that the mock map data server 115 may be implemented as a module of any of the components of the system 100 (e.g., a component of the mapping platform 109 or other device, service, or application with connectivity to the system 100). In another embodiment, one or more of the modules 301-307 may be implemented as a cloud-based service, local service, native application, or combination thereof. The functions of the mock map data server 115 and modules 301-307 are discussed with respect to the figures below.

Figure 4:
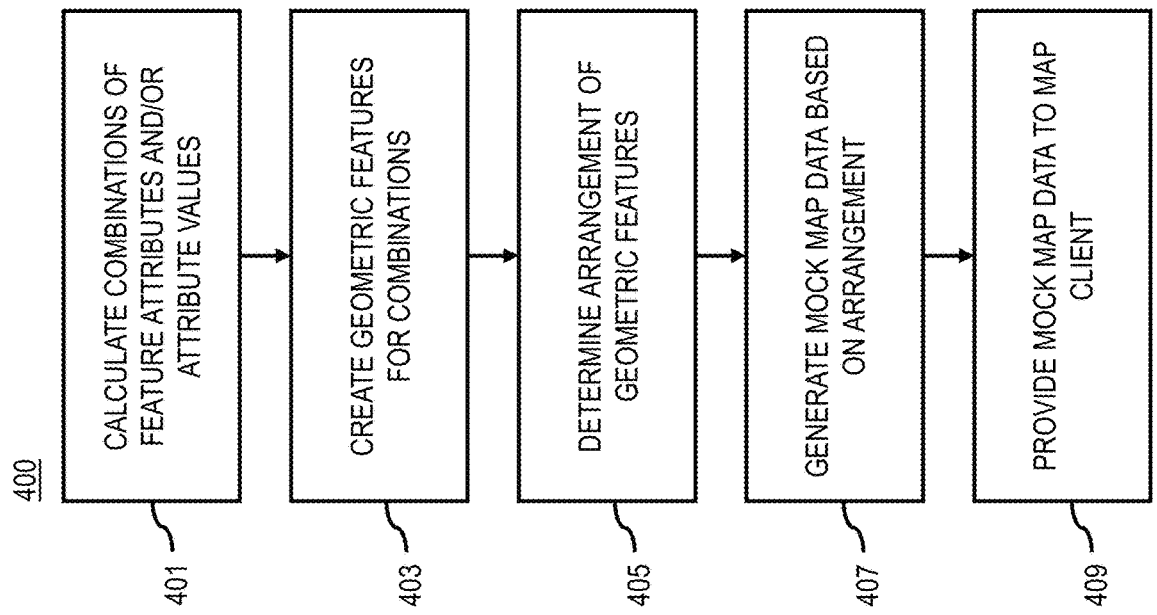
FIG. 4 is a flowchart of a process for providing mock map data for map design validation and document, according to one embodiment.
Figure 9:
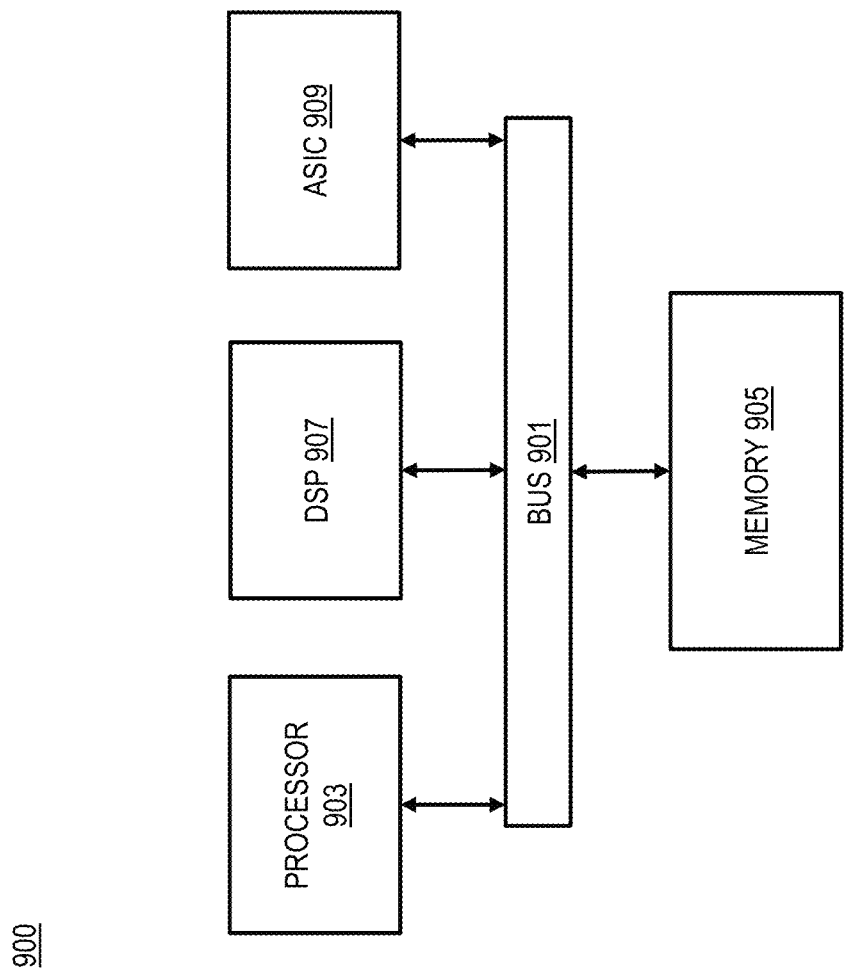
FIG. 9 is a diagram of a chip set that can be used to implement an embodiment of the invention.

FIG. 4 is a flowchart of a process for providing mock map data for map design validation and document, according to one embodiment. In various embodiments, the mock map data server 115 and/or any of the modules 301-307 may perform one or more portions of the process 400 and may be implemented in, for instance, a chip set including a processor and a memory as shown in FIG. 9. As such, the mock map data server 115 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

By way of example, the various embodiments of the process 400, the mock map data server 115, and modules 301-307 can be applicable to various uses including but not limited to:

By cartographic designers, to test styling of different combinations of features and attributes;

To perform exhaustive functional testing including edge cases which are uncommon in real maps; and For performance testing by creating high quantities of features, geometry, or complex geometry.

A technical advantage of the various embodiments of the mock map data server 115 described herein as compared to other mock approaches, is that the procedurally generated mock tile data 117 can be used by any application (e.g., any map client 105) capable of consuming the mock tile data 117 (e.g., MVT, OMV, or equivalent map tiles) without modification apart from providing a different server endpoint.

In one embodiment, the mock map data generation in the various embodiment of process 400 is procedural. This enables the mock map data server 115 to generate large quantities of various combinations of geometries and attributes that are arranged in patterns that are suited for map style validation, documentation, and comparison when real-world feature geometries are not needed.

Although the various embodiments if the process 400 is described below with respect to implementation of the mock map data server 115 using Python modules, it is contemplated the mock map data server 115 may be implemented using any equivalent module, hardware, software, firmware, circuitry, etc.

In step 401, the feature module 301 calculates one or more combinations of one or more map feature attributes, one or more map feature attribute values, or a combination thereof to initiate the process 400 for generating mock map data (e.g., mock tile data 117). As previously described the features can be cartographic or map features (e.g., roads, bridges, POIs, terrain, land use categories) included in the geographic database 101 or equivalent digital map data. Depending on the specific type of feature, each feature can have varying attributes. For example, roads can have feature attributes such as but not limited to functional class, road surface, number of lanes, supported traffic types, etc. Then each feature attribute can have different values. For example, the feature attribute of a function class of a road can have values such as but not limited to functional class 1, functional class 2, functional class 3, etc. As a result, when multiple feature attributes and/or respective attribute values are selected, the number of possible combinations of feature attributes and values can quickly grow.

In one embodiment, the feature attributes and attribute values that are to be processed to generate mock tile data 117 or mock map data in general can be specified by a user. For example, the mock map data server 115 can present a user interface to the user for selecting location data, map data, map feature catalogs, etc. from which the feature attributes and attribute values can be selected. In one embodiment, the user may have access to a reduced set of location data, map data, map feature catalogs, etc. The set may be reduced due, for instance, to access rights, purchased/licensed features, geographic restrictions, etc. During a map design session, the platform user may start with a full selection of the features available to the platform user, de-select some of the features, or start with a blank set and add desired features. In one embodiment, the user interface may provide easy selection of the features, feature attributes, attribute values, and/or feature categories by using tick boxes, search input, radio buttons, and/or any other equivalent user interface element.

The user, for instance, can provide as input one or more attribute lists that specify the feature attributes of interest and/or attribute values. For example, referring back to the example of FIG. 2A, the user can provide a first attribute list for road functional class that lists the following attribute values: highway trunk (HT), major primary road (MPR), major secondary road (MSR), major tertiary road (MTR), minor unclassified road (MUR), minor service road (MvR), minor residential road (MRR), pedestrian path (PP), and footway path (FP). Then, the user can also provide a second attribute list for bridge function class that lists the following values: highway trunk bridge (HTB), major primary road bridge (MPRB), major secondary road bridge (MSRB), major tertiary road bridge (MTRB), minor unclassified road bridge (MURB), and minor service road bridge (MvRB).

Based on the input above, the feature module 301 can determine possible combinations of the attribute lists provided by the user. In one embodiment, a combinations Python module is provided and enables the feature module 301 to create all attribute value combinations from user defined attribute names and attribute values belonging to each name. The following is an example use of the combinations Python module:

Attribute a has two possible values:

```
>>> combinations({"a": [1, 2]})
[{'a': 1}, {'a': 2}]
```

Two attributes, a and b, are provided, each with two possible values:

```
>>> combinations({"a": [1, 2], "b": [3, 4]})
[{'a': 1, 'b': 3}, {'a': 1, 'b': 4}, {'a': 2, 'b': 3}, {'a': 2, 'b': 4}]
```

Advanced use case for dependent attributes—if a is 1, b can be only 3:

```
>>> combinations.combinations({"a": [(1, {"b":[3]}), (2, {"b":[3, 4]})]})
[{'a': 1, 'b': 3}, {'a': 2, 'b': 3}, {'a': 2, 'b': 4}]
```

With respect to the example of FIG. 2A, the possible combinations of the road attributes and bridge attributes are illustrated in Table 1 below. In Table 1, road attribute values are listed horizontally across the columns of the table by acronym and bridge attribute values are listed vertically across the rows of the tables by acronym. The cells of the table provide each different combination of road and bridge attributes.

TABLE 1

|  | HT | MPR | MSR | MTR | MUR | MvR | MRR | PP | FP |
|---|---|---|---|---|---|---|---|---|---|
| HTB | HT:<br>HTB | MPR:<br>HTB | MSR:<br>HTB | MTR:<br>HTB | MUR:<br>HTB | MvR:<br>HTB | MRR:<br>HTB | PP:<br>HTB | FP:<br>HTB |
| MPRB | HT:<br>MPRB | MPR:<br>MPRB | MSR:<br>MPRB | MTR:<br>MPRB | MUR:<br>MPRB | MvR:<br>MPRB | MRR:<br>MPRB | PP:<br>MPRB | FP:<br>MPRB |
| MSRB | HT:<br>MSRB | MPR:<br>MSRB | MSR:<br>MSRB | MTR:<br>MSRB | MUR:<br>MSRB | MvR:<br>MSRB | MRR:<br>MSRB | PP:<br>MSRB | FP:<br>MSRB |
| MTRB | HT:<br>MTRB | MPR:<br>MTRB | MSR:<br>MTRB | MTR:<br>MTRB | MUR:<br>MTRB | MvR:<br>MTRB | MRR:<br>MTRB | PP:<br>MTRB | FP:<br>MTRB |
| MURB | HT:<br>MURB | MPR:<br>MURB | MSR:<br>MURB | MTR:<br>MURB | MUR:<br>MURB | MvR:<br>MURB | MRR:<br>MURB | PP:<br>MURB | FP:<br>MURB |
| MvRB | HT:<br>MvRB | MPR:<br>MvRB | MSR:<br>MvRB | MTR:<br>MvRB | MUR:<br>MvRB | MvR:<br>MvRB | MRR:<br>MvRB | PP:<br>MvRB | FP:<br>MvRB |

It is noted that any number of feature attribute lists can be specified by the user from one to multiple, with the number of possible combinations growing exponentially with the number of feature attribute lists.

After the possible combinations of selected feature attributes and attribute values are determined, the geometry module 303 creates one or more geometric features respectively for the one or more combinations (step 403) and determines an arrangement of the one or more geometric features within a designated geographic area (step 405). The new geometric feature to create depends on the feature attributes/values included in each combination. In one embodiment, the feature can be determined heuristically using rules or determined using any other process including but not limited to a machine learning model (e.g., a neural network or equivalent) trained to determine the optimal geometric feature to represent a particular combination of feature attributes. For example, geometric features such as intersections can be generated to represent the combination of two road features, a road feature with a bridge feature, etc.

Figure 5A:
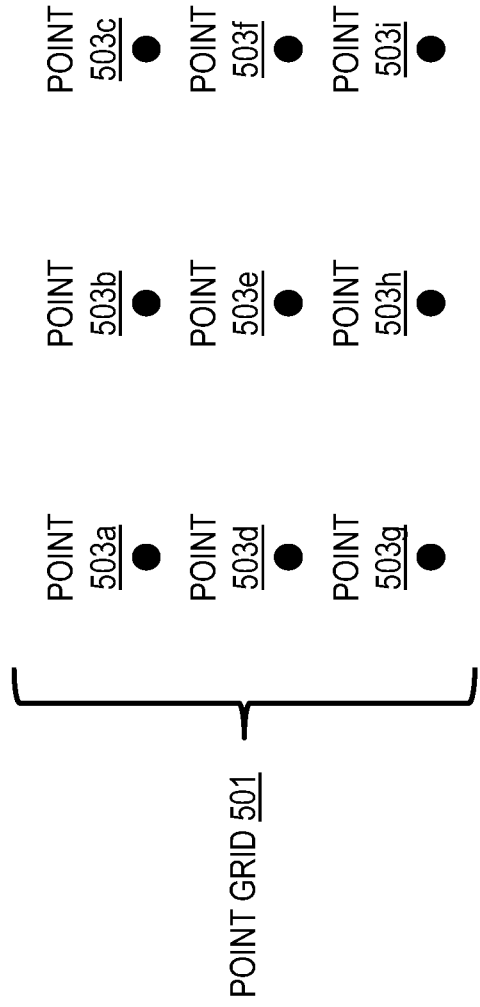
FIGS. 5A-5G are diagrams of example map style taxonomy charts, according to one embodiment.
Figure 5B:
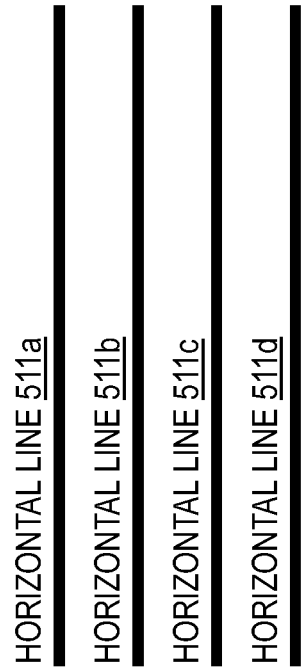
Figure 5C:
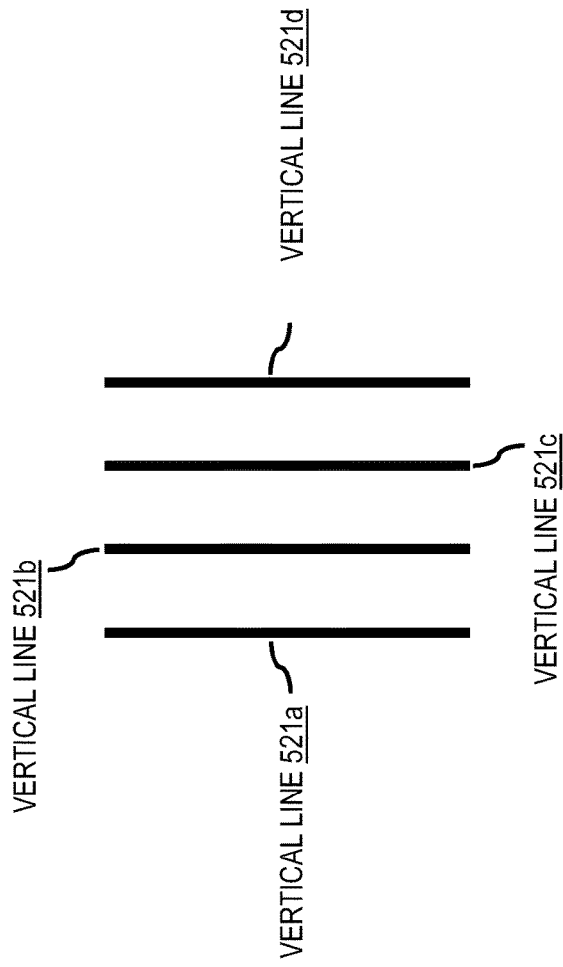
Figure 5D:
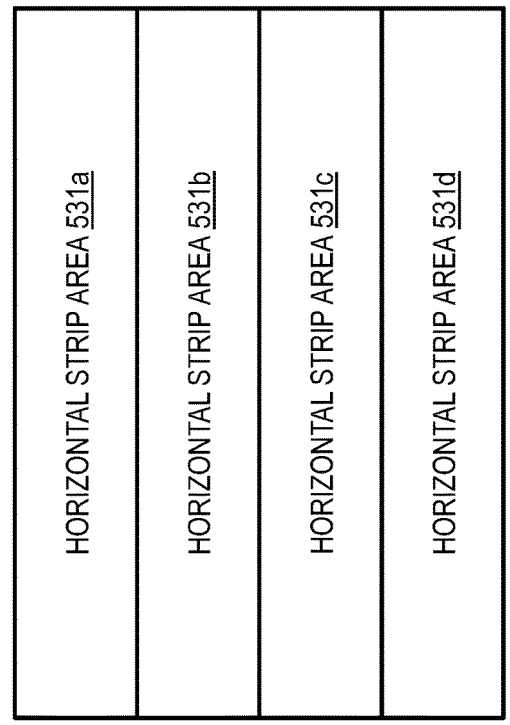
Figure 5E:
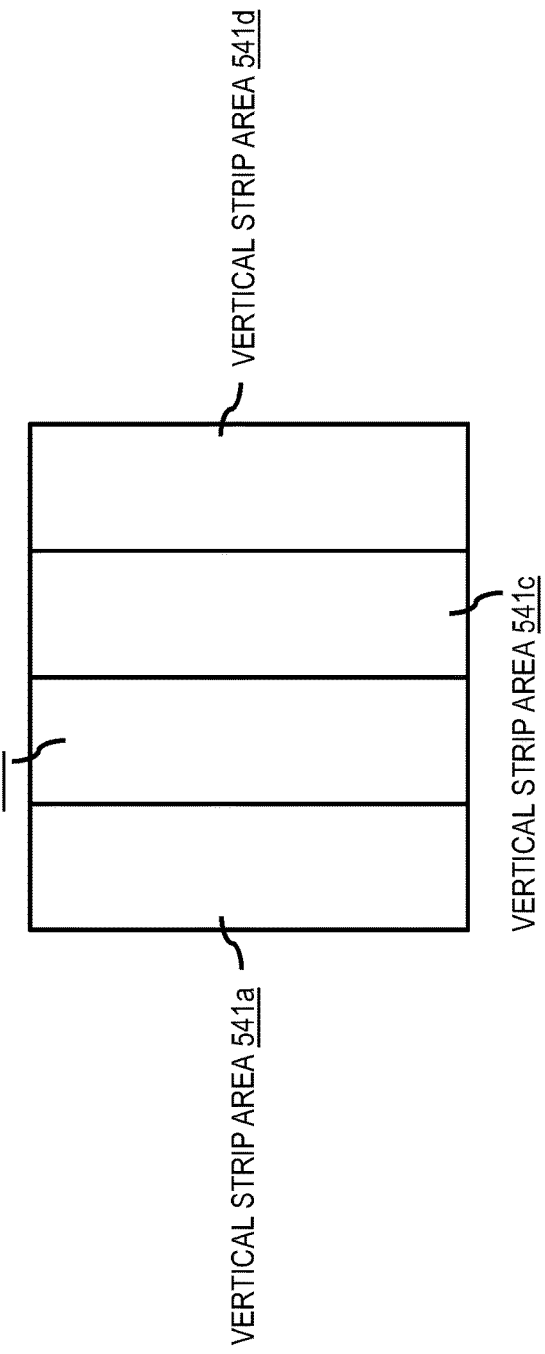
Figure 5F:
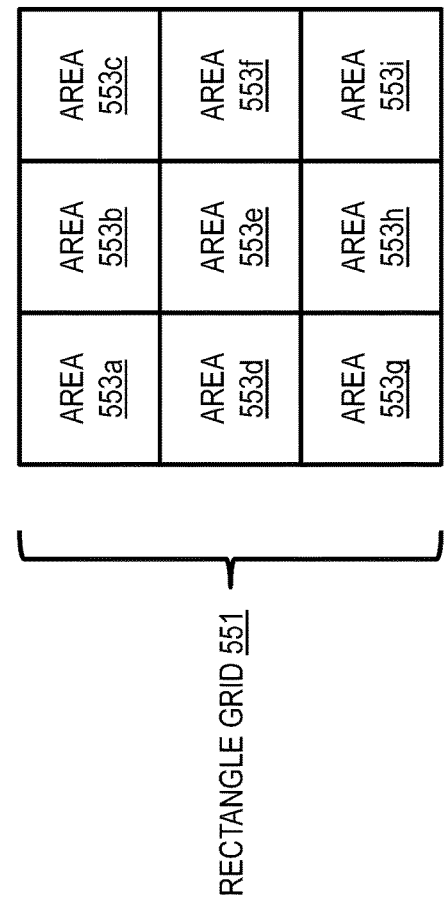

Then, the geometry module 303 can arrange the geometric features into a pattern so that they can be viewed in a compact area when rendered by a map client 105. In one embodiment, the pattern or arrangement includes an intersection arrangement of the geometric features (e.g., the one or more feature attributes, attribute values, or a combination thereof). For example, the geometric features can be rendered or otherwise represented as respective linear features in a pattern (e.g., a grid of vertical and horizontal lines, concentric circular features intersecting with vertical and/or horizontal linear features, etc.) such that each linear feature intersects with all other linear features. In this way, each combination of the styled representations of the features can also be overlapped for viewing, documentation, and/or validation of the applied map style taxonomy. It is contemplated that different kinds of geometries or arrangements can be created. Examples of these geometries include but are not limited to:

A point grid (pointGrid): as shown in example point grid 501 of FIG. 5A, each attribute set creates a new point feature (e.g., point features 503a-503i—also collectively referred to as point features 503), and point features 503 are laid out into a grid;

A horizontal line (horizontal Lines): as shown in FIG. 5B, each attribute set creates a new horizontal line feature (e.g., horizontal lines 511a-511d—also collectively referred to as horizontal lines 511), and horizontal lines 511 are stacked on top of one another;

A vertical line (verticalLines): as shown in FIG. 5C, each attribute set creates a new vertical line feature (e.g., vertical lines 521a-521d—also collectively referred to as vertical lines 521), and vertical lines 521 are put next to each-other;

A horizontal strip (horizontalStrips): as shown FIG. 5D, each attribute set creates a new horizontal strip area feature (e.g., horizontal strip areas 531a-531d—also collectively referred to as horizontal strips 531), and horizontal strips 531 are stacked on top of another;

A vertical strip (verticalStrips): as shown in FIG. 5E, each attribute set creates a new vertical strip area feature (e.g., vertical strip areas 541a-541d—also collectively referred to as vertical strips 541), and vertical strips 541 are put next to another; and A rectangle grid (rectangleGrid): as shown in example rectangle grid 551 of FIG. 5F, each attribute set creates a new rectangle area feature (e.g., area 553a-553i—also collectively referred to as rectangle areas 553), and the rectangle areas 553 are laid out into a grid 551.

Figure 5G:

In one embodiment, the user can provide two or more lists of attributes sets. In this case, a cartesian product of the lists can be generated with one feature for each combination of feature sets from the first attribute list and the second attribute list. The resulting feature combinations can be organized into a grid (or other two-dimensional/multi-dimensional representation) in comparison to a single attribute list which can be presented using one dimension. FIG. 5G illustrates an example map image 561 depicting a cartesian product. In the example of FIG. 5G, one dimension of the cartesian product has different functional classes of a road (e.g., which affects the shading of the visual representation of the road), and another dimension has closure status of the road which determines whether the visual representation of road is a solid line (e.g., indicating a road is open to traffic) or a dashed line (e.g., indicating a road is closed to traffic). Another example of a cartesian product is in the previously discussed FIG. 2C. In the example of FIG. 2C, one dimension of the cartesian product has different building heights, and another dimension has different building types which influence the rendered color of its visual representation.

Other general examples of cartesian product representations include but are not limited to:

A cartesian product point grid (cartesianProductPointGrid): point features in a grid (e.g., similar to the example of FIG. 5A but with multiple feature attributes);

A cartesian product line grid (cartesianProductLineGrid): line feature for each cell of a grid (e.g., similar to the example of FIG. 2A).

A cartesian product rectangle grid (cartesianProductRectangleGrid): rectangle feature for each grid cell (e.g., similar to the examples of FIGS. 2B and 5F but with multiple feature attributes).

In one embodiment, the geometry module 303 can use a layout function to determine the arrangement of geometric features based on additional parameters. Examples of these additional parameter include but are not limited to:

- A countPerTile/countPerDimension parameter specifies the number of features per tile width/height or other geographic area dimension (e.g., x distance and y distance of a geographic in meters). This parameter controls how densely the selected features are procedurally packed in a given tile or designated geographic area of the mock map data. In case there are too many features to fit into a tile or geographic at the specified count, additional tiles (e.g., adjacent below/above or to the right/left of the current tile) are reserved to contain the overflow features. When countPerTile is 1, each feature will have a separate tile.
- A gap parameter controls the gap between the features in the arrangement. For example, in one embodiment, the range for this parameter can be [0,1] with 0 indicating that the features are touching and 1 indicating that the feature is the maximum set distance apart (e.g., 1 map tile apart).

In one embodiment, the geometry module 303 can build functions for arranging different types of feature attribute combinations based on the above geometric arrangements and parameters. For example, a function to arrange land use attributes (e.g., in which geographic areas with different lang uses can be colored or style different such as green indicating park areas, pink indicating hospital areas, gray indicating industrial areas, etc.) can use the rectangleGrid module arrange rectangular areas corresponding to different land use attribute values in a grid pattern. Alternatively the land use function (e.g., mock_landuse.py Python function) can be modified to use horizontalStrips and/or verticalStrips instead.

In step 407, after the geometric features of the feature combinations and their arrangements are determined, the data generation module 305 generates the data in the mock map database 119 (e.g., mock tile data 117) based on the arrangement. More specifically, in one embodiment, the data generation module 305 encodes the geometric features and their arrangement into vector-based map tiles in a standard format (e.g., MVT, OMV, or any other map data format known in the art) that is compatible with target map clients 105.

In one embodiment, as part of the tile encoding process, a Protobuf compiler generated file vector_tile_pb2.py (based on Mapbox Vector Tile Specification vector_tile.proto) is wrapped by vector_tile module. Table 2 below illustrates the Mapbox vector tile specification.

TABLE 2

```
package
vector_tile;
   option optimize_for = LITE_RUNTIME;
   message Tile {
      // GeomType is described in section 4.3.4 of the specification
      enum GeomType {
        UNKNOWN = 0;
        POINT = 1;
        LINESTRING = 2;
        POLYGON = 3;
      }
      // Variant type encoding
      // The use of values is described in section 4.1 of the
      specification
```

TABLE 2-continued

```
      message Value {
         // Exactly one of these values must be present in a valid
   message
         optional string string_value = 1;
         optional float float_value = 2;
         optional double double_value = 3;
         optional int64 int_value = 4;
         optional uint64 uint_value = 5;
         optional sint64 sint_value = 6;
         optional bool bool_value = 7;
         extensions 8 to max;
      }
      // Features are described in section 4.2 of the specification
      message Feature {
         optional uint64 id = 1 [ default = 0 ];
         // Tags of this feature are encoded as repeated pairs of
         // integers.
         // A detailed description of tags is located in sections
         // 4.2 and 4.4 of the specification
         repeated uint32 tags = 2 [ packed = true ];
         // The type of geometry stored in this feature.
         optional GeomType type = 3 [ default = UNKNOWN ];
         // Contains a stream of commands and parameters
   (vertices).
         // A detailed description on geometry encoding is located
   in
         // section 4.3 of the specification.
         repeated uint32 geometry = 4 [ packed = true ];
      }
      // Layers are described in section 4.1 of the specification
      message Layer {
         // Any compliant implementation must first read the
   version
         // number encoded in this message and choose the correct
         // implementation for this version number before
   proceeding to
         // decode other parts of this message.
         required uint32 version = 15 [ default = 1 ];
         required string name = 1;
         // The actual features in this tile.
         repeated Feature features = 2;
         // Dictionary encoding for keys
         repeated string keys = 3;
         // Dictionary encoding for values
         repeated Value values = 4;
         // Although this is an "optional" field it is required by
   the specification.
         // See https://github.com/mapbox/vector-tile-
   spec/issues/47
         optional uint32 extent = 5 [ default = 4096 ];
         extensions 16 to max;
      }
      repeated Layer layers = 3;
      extensions 16 to 8191;
   }
```

The module implements geometry and attribute encoding specified by the vector tile specification. By way of example, it has two classes to help populate tile with mock map data content: Layer and Tile. Layer represents a vector tile layer. A single tile can contain multiple layers. Each Layer can in turn contain multiple features. Features are added by functions: addPoint, add Line, and addArea. Each of these functions accepts a list of coordinates and a dictionary with attributes. The coordinates and attributes to add is based on the selected feature attributes and attributes along with the geometric features corresponding to each combination of feature attributes and attribute values and the determined arrangement of those features.

In one embodiment, the coordinates are represented by an (x, y) tuple. The range of coordinate values is [0, 1] normalized to the extent of a map tile or equivalent designated geographic area (or equivalent coordinate system). In one embodiment, the mock map data is generated at one or more map zoom levels such that the corresponding geographic extent of the map tile can depend on the selected zoon level. Values out of this range can be used as well. In that case, the geometry of the corresponding feature stretches beyond the tile border. An example of this coordinate representation is as follows:

```
# A diagonal line through the extent of the tile
points = [(0,0),(1,1)]
```

Attributes is a dictionary of attributes associated with the feature. An example of example specifying attributes is as follows:

```
attributes = {"name": "feature name", "kind": "feature kind"}
```

A Tile object represents a vector tile. A new layer is added to a tile by calling add Layer. Since there can be only one layer for a specific layer name, an existing layer is returned if add Layer is called multiple times with the same layerName parameter. After all the layers have been added, the serialize function generates a corresponding tile binary blob (e.g., the mock tile data 117). An example of this process is as follows:

```
layer = Layer("pois")
layer.addPoint([(10, 20)], {"name": "a point", "some other attribute": "other value"})
# ... add more/different geometry
tile = Tile( )
tile.addLayer(layer)
# ... add more layers
tile.serialize( )
```

In one embodiment, the vector_tile module can be used directly. However, use of the vector_tile module in combination with some common tile content generation patterns of the layout module can be used. Feature generation with the layout module provides a way to automatically and procedurally generate geometric features based on user provided sets of attributes as described above with respect to the various embodiments of steps 401-403. For example, the layout module uses respective geometry modules (e.g., pointGrid, horizontalLines, verticalLines, horizontalStrips, verticalStrips, rectangleGrid, cartesianProductPointGrid, cartesianProductLineGrid, cartesianProductRectangleGrid,) along with layout parameters (e.g., countPerTile/countPerDimension, and gap) to automatically arrange various combinations of feature attributes and attributes values in patterns for to generate the data in the mock map database 119 (e.g., mock tile data 117).

In step 409, the data server 307 provides the data in the mock map database 119 (e.g., the mock tile data 117) to a map client 105. In one embodiment, the data server 307 can be a simple HTTP server calling one or more of the mock map data generator functions (as described in the various embodiments above) with a requested row, column, and level (e.g., map zoom level) of a mock map data tile. The corresponding data in the mock map database 119, for instance, can be provided over a communication network 111 to the requesting map client 105 (e.g., a mapping application or map editor that supports the data format of the mock map database 119—such as the data format of real-world map data of the geographic database 101). In one embodiment, the map client 105 can be redirected to receive map data from the mock map data server 115 instead of the mapping platform 109 that provides real-world map data from the geographic database 101 (e.g., because the data of the mock map database 119 is generated in a map data format compatible with real-world map data already used by the map client 105). This can be performed, for instance, by modifying the server URL configured in the map client 105 to the URL of the mock map data server 115.

After the map client 105 receives the requested mock tile data 117 (e.g., containing procedurally generated combinations of feature attributes and values arranged in a compact pattern according to the various embodiments described herein), the map client 105 can render the mock tile data 117 (e.g., provided from the mock map database 119 as vector-based map data) in a map image 103 (e.g., bitmap image for presenting in a mapping user interface or display of a device) based on a map style taxonomy 107.

In one embodiment, the map style taxonomy 107 assigns one or more visual attributes (e.g., appearance styles such as but not limited to different line width, color, outline, cap style, font properties, zoom level display, symbol, textures, shapes, etc.) respectively to the one or more map feature attributes, the one or more map feature attribute values, the one or more combinations of the features, or a combination thereof. In this way, the one or more visual attributes are rendered in the map image to represent the one or more map feature attributes, the one or more map feature attribute values, the one or more combinations, or a combination thereof. In other words, a style taxonomy may specify how each feature is styled when rendered in an image for display. By changing part or all of the style taxonomy, the look and feel of the resulting rendered map data can be changed. Because there can be potentially hundreds or more different features and exponentially more combinations of those features, the map style taxonomy can be a complex hierarchy of features and corresponding appearance. This is especially true, when the appearance of features can change with varying zoom levels (e.g., feature sizes, color, line widths, etc.) applied to the map data.

Because the data in the mock map database 119 (e.g., the mock tile data 117) is procedurally generated, the resulting rendered map image 103 can more compactly depict cartographic features that may be difficult to find in one real-world map tile. In addition, new cartographic features that have not been labeled or represented in existing real-world map data can nonetheless be included in the procedurally generated mock tile data 117 (e.g., as optionally stored in the mock map database 119). In other words, the one or more map feature attributes, the one or more map feature attribute values, or a combination thereof selected for generating the mock tile data 117 or other equivalent map data of the mock map database 119 may not be currently represented or exist in real-world map data (e.g., the geographic database 101). In this way, designs for new features can be completed and tested before those features are placed into production map data.

The systematic and orderly arrangement of different combinations of selected map features also enable map designers to quickly validate whether their map design choices are visually appealing across a wide range of scenarios without have to query and discover real-world locations with equivalent combinations. In other embodiments, the map images 103 rendered by the map clients 105 using mock tile data 117 or any other map data of the mock map database 119 can be provided as an output that visually documents the map style taxonomy used to render the image 103. In this way, manual creation of map style taxonomy charts can be avoided.

Figure 6A:
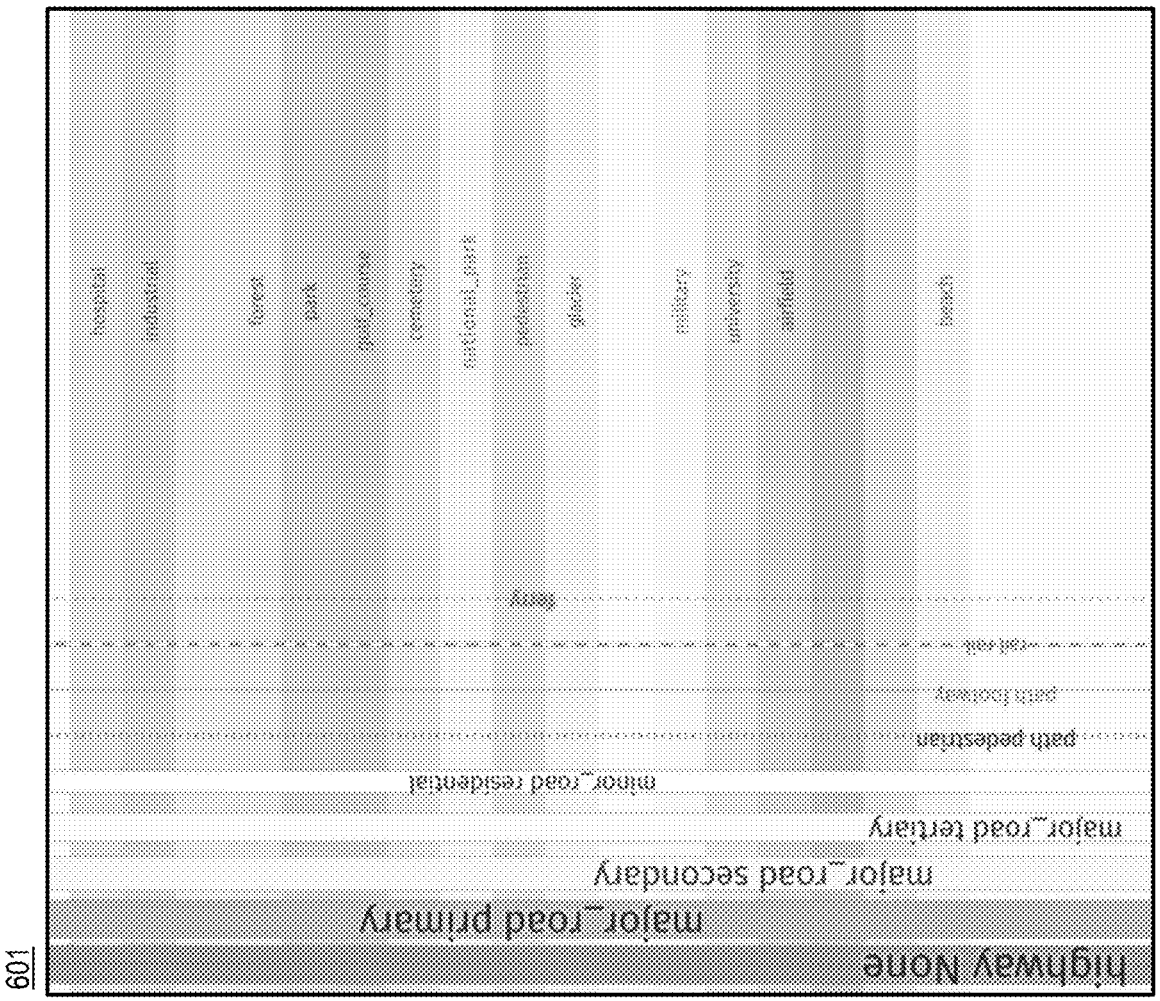
FIGS. 6A-6C are diagrams of example geometric arrangements for rendering mock map data, according to one embodiment.
Figure 6B:
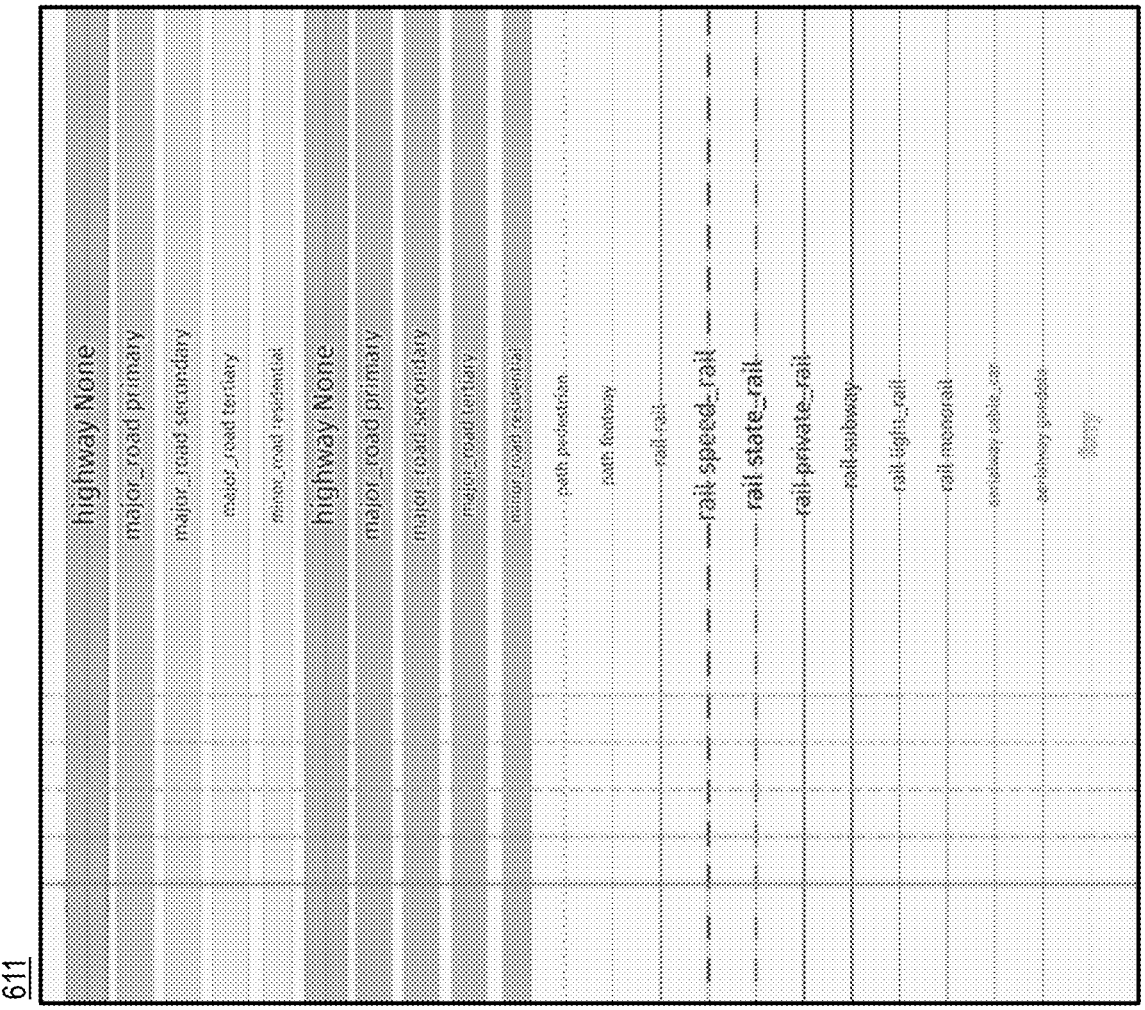
Figure 6C:
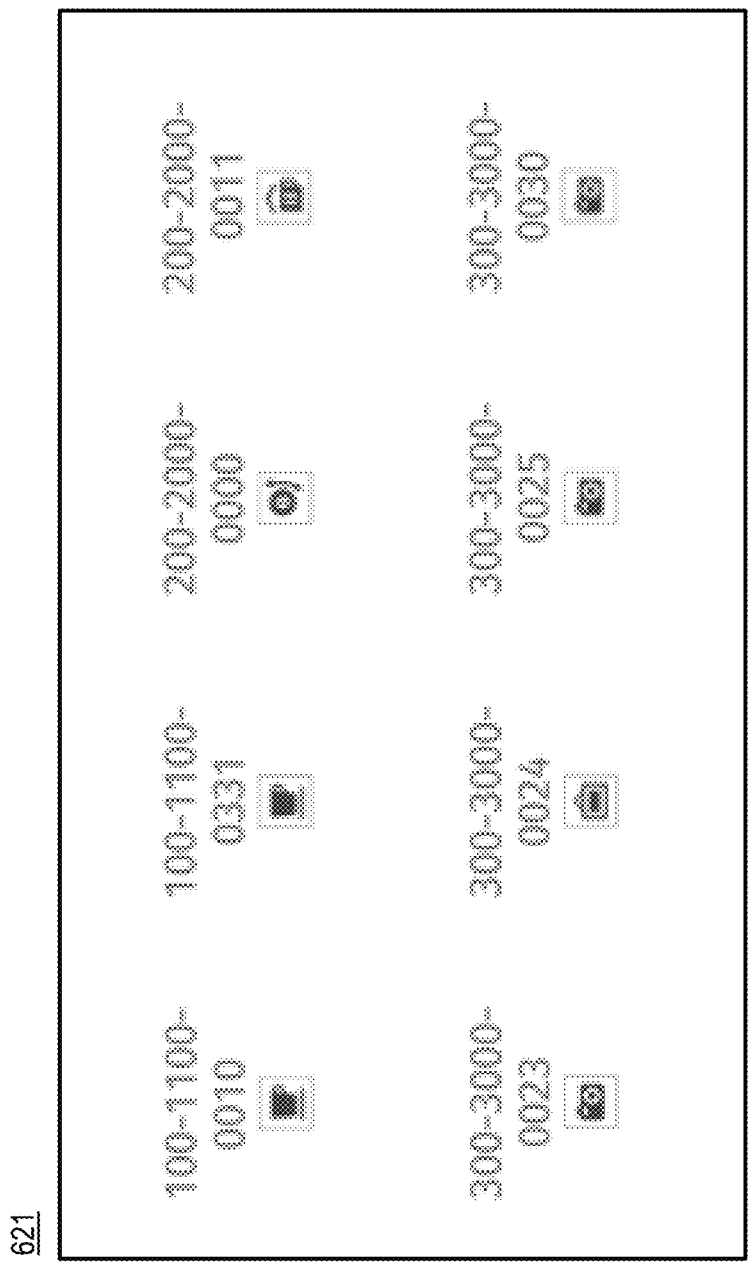

FIGS. 6A-6C illustrate additional examples of map images 103 rendered from mock tile data 117 or any other map data of mock map database 119 generated based on various feature attribute lists, according to various embodiments. The example rendered map image 601 of FIG. 6A illustrates roads and railways against land use based on a selected style taxonomy. More specifically, the feature attributes selected for generating the corresponding mock tile data 117 or other equivalent map data of the mock map database 119 includes a first attribute list of road/railway classes (e.g., with attribute values of highway, major road primary, major road secondary, major road tertiary, minor road residential, path pedestrian, path footway, rail, and ferry) and a second attribute list of land use categories for the land on which the road/railways are located (e.g., with attribute values of beach, airfield, university, military, glacier, pedestrian, national park, cemetery, golf course, park, forest, industrial, and hospital). The mock map data server 115 used a vertical line arrange to represent roads/railways overlaid on a horizontal strip arrangement of the land use categories. As map image 601 illustrates, this orderly arrangement enables a compact view of all possible combinations of the road/railway types against the land use categories. For example, the grid arrangement of linear features causes all features to intersect with each other, allowing a user to determine if different style choices collide with each other across a range of feature combinations. In addition, because the map image 601 is rendered in a map client 105 that supports zooming to different map levels, the designer can interactively change zoom levels to validate or document how the style of the map may also change. Validate, in this case, refers to an enabling the designer or user to visually inspect design elements to ensure it is the design intended by the designer (e.g., whether any features become inadvertently invisible or difficult to see based on design choices—such as selected the same or similar colors for background versus text, etc.).

The example rendered map image 611 of FIG. 6B illustrates a road and railways against administrative lines. In this example, the combination of road/railway feature attributes against administrative line attributes are generated in the corresponding mock tile data 117 or other equivalent map data of the mock map database 119 as a line grid with horizontal lines representing different road/railway attribute values and vertical lines representing different administrative lines. As with the example of FIG. 6B, this line grid representation of feature combinations enables a user to quickly view or document the map design of the roads/railways against administrative lines in a compact area. Because the line grid is procedurally generated by the mock map data server 115, no manual editing or creating of map data is needed to produce the mock map tile data 117 or equivalent map data of the mock map database 119 and resulting map image 611. As a result, the various embodiments described herein provided for several technical advantages including but not limited to automated production of the mock tile data 117 or other equivalent map data of the mock map database 119, increased speed of validating/documenting map designs, and reduction of manual resources.

The example rendered map image 621 of FIG. 6C illustrates a point grid arrangement of different points of interested with their respective stylized symbols. In this example, the attribute list specifies different types of points of interest (e.g., coffee shops, music stores, bars, scenic locations, and work locations). The corresponding mock tile data 117 or other equivalent map data of the mock map database 119 was generated so that the locations of the different POI types are arranged in a grid pattern. In this way, the symbols specified for each POI type in the corresponding style taxonomy can be viewed and documented in a compact area.

Returning to FIG. 1, in one embodiment, the mock map data server 115 has connectivity or access to a mock map database 119 that includes mock mapping data (e.g., mock tile data 117 or other map data format) generated according to the various embodiments described herein. In addition, the system 100 includes a mapping platform 109 (e.g., a non-mock map data server) with connectivity to the geographic database 101 that provides real-world or production map data. The mock map database 119 is equivalent to the geographic database 101 but instead store mock map data instead of or in addition to real-world data. Thus both support the same map format (e.g., vector-based formats such as MVT, OMV, or equivalent) and include or otherwise support a tile projection of the map data. In one embodiment, the mock map database 119 and the geographic database 101 can included in the same database (e.g., either all in the mock map database 119 or all in the geographic database 101) or be included in any other equivalent digital map data store.

In one embodiment, the map client 105 (e.g., an application executing on a device) has connectivity to the mock map data server 115 and/or the mapping platform 109 to receive mock map data (e.g., mock tile data 117 or other equivalent map data of the mock map database 119) for rendering according to the various embodiments described herein. For example, the map client 105 can be otherwise include a mapping application (e.g., map editor) and/or any other location-based application that can act as a client to the mock map data server 115. By way of example, the map client 105 can be executed on or is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the map client 105 can support any type of interface to the user (such as "wearable" circuitry, etc.). In one embodiment, the map client 105 may be associated with a vehicle (e.g., cars), a component part of the vehicle, a mobile device (e.g., phone), and/or a combination of thereof. Similarly, the vehicle and/or mobile device may include computing components that can perform all or a portion of the functions of the map client 105. By way of example, the map client 105 may include any type of application such as vehicle control application, mapping application, location-based service applications, navigation applications, content provisioning services, camera/imaging application, media player applications, social networking applications, calendar applications, and the like. In one embodiment, the map client 105 may act as a client for the mock data server 115 and/or mapping platform 109 and perform one or more functions of either component alone or in combination with the mock data server 115 and/or mapping platform 109.

In one embodiment, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mock data server 115 may be a platform with multiple interconnected components. The mock data server 115 may include multiple servers, intelligent networking devices, computing devices, components and corresponding software for providing mock map data according to the various embodiments described herein.

By way of example, the map client 105, mock map data server 115, and mapping platform 109 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
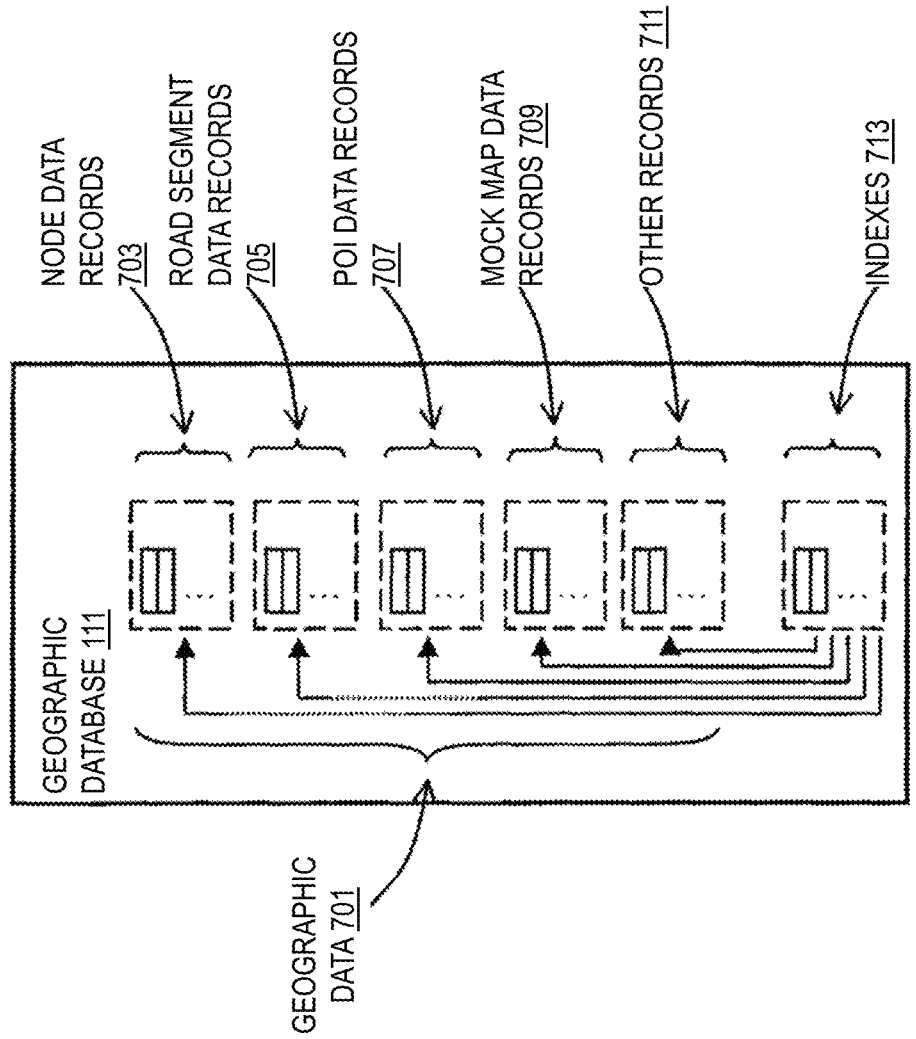
FIG. 7 is a diagram of a geographic database, according to one embodiment.

FIG. 7 is a diagram of the geographic database 101 of system 100, according to exemplary embodiments. In one embodiment, the description of the geographic database 101 provided herein is also applicable to the mock map database 119. In some embodiment, the geographic database 101 can include the data that would otherwise be stored in the mock map database 119.

In one embodiment, the geographic database 101 include high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 101 includes geographic data 701 used for (or configured to be compiled to be used for) mapping and/or navigation-related services, such as for personalized route determination, according to exemplary embodiments. For example, the geographic database 101 includes node data records 703, road segment or link data records 705, POI data records 707, mock map data records 709, other records 711, and indexes 713. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 101. The indexes 713 may be used to quickly locate data without having to search every row in the geographic database 101 every time it is accessed.

In exemplary embodiments, the road segment data records 705 are links or segments representing roads, streets, or paths, as can be used in the calculated route or recorded route information for determination of one or more personalized routes, according to exemplary embodiments. The node data records 703 are end points corresponding to the respective links or segments of the road segment data records 705. The road link data records 705 and the node data records 703 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 707. The geographic database 101 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 101 is presented according to a hierarchical or multi-level tile projection. More specifically, in one embodiment, the geographic database 101 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

In one embodiment, the geographic database 101 can also include mock map data records 709 for storing the data of the mock map database 119 (e.g., mock tile data 117) and/or any other related data that is used or generated according to the embodiments described herein. By way of example, the mock map data records 709 can be associated with one or more of the node records 703, road segment records 705, and/or POI data records 707 to associate the mock map data records 709 with specific places, POIs, geographic areas, and/or other map features. In this way, the mock map data records 709 can also be associated with the characteristics or metadata of the corresponding records 703, 705, and/or 707.

In one embodiment, the geographic database 101 can be maintained by a content provider in association with the services platform (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database 101 or data in the master geographic database 101 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as autonomous vehicle operation, route calculation, route guidance, map display, speed calculation, distance and travel time functions, and other functions, by a navigation device, such as by a vehicle or mobile device. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 101 can be a master geographic database, but in alternate embodiments, the geographic database 101 can represent a compiled navigation database that can be used in or with end user devices (e.g., map clients 105) to provide mapping and/or navigation-related functions. For example, the geographic database 101 can be used with the end user device to provide an end user with navigation features. In such a case, the geographic database 101 can be downloaded or stored on the end user device (e.g., map client 105). The end user device can access the geographic database 101 through a wireless or wired connection (such as via a server and/or the communication network 111), for example.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device can be a cellular telephone. An end user can use the device navigation functions such as guidance and map display, for example, and for determination of route information to at least one identified point of interest, according to exemplary embodiments.

The processes described herein for providing mock map data for map design validation and documentation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
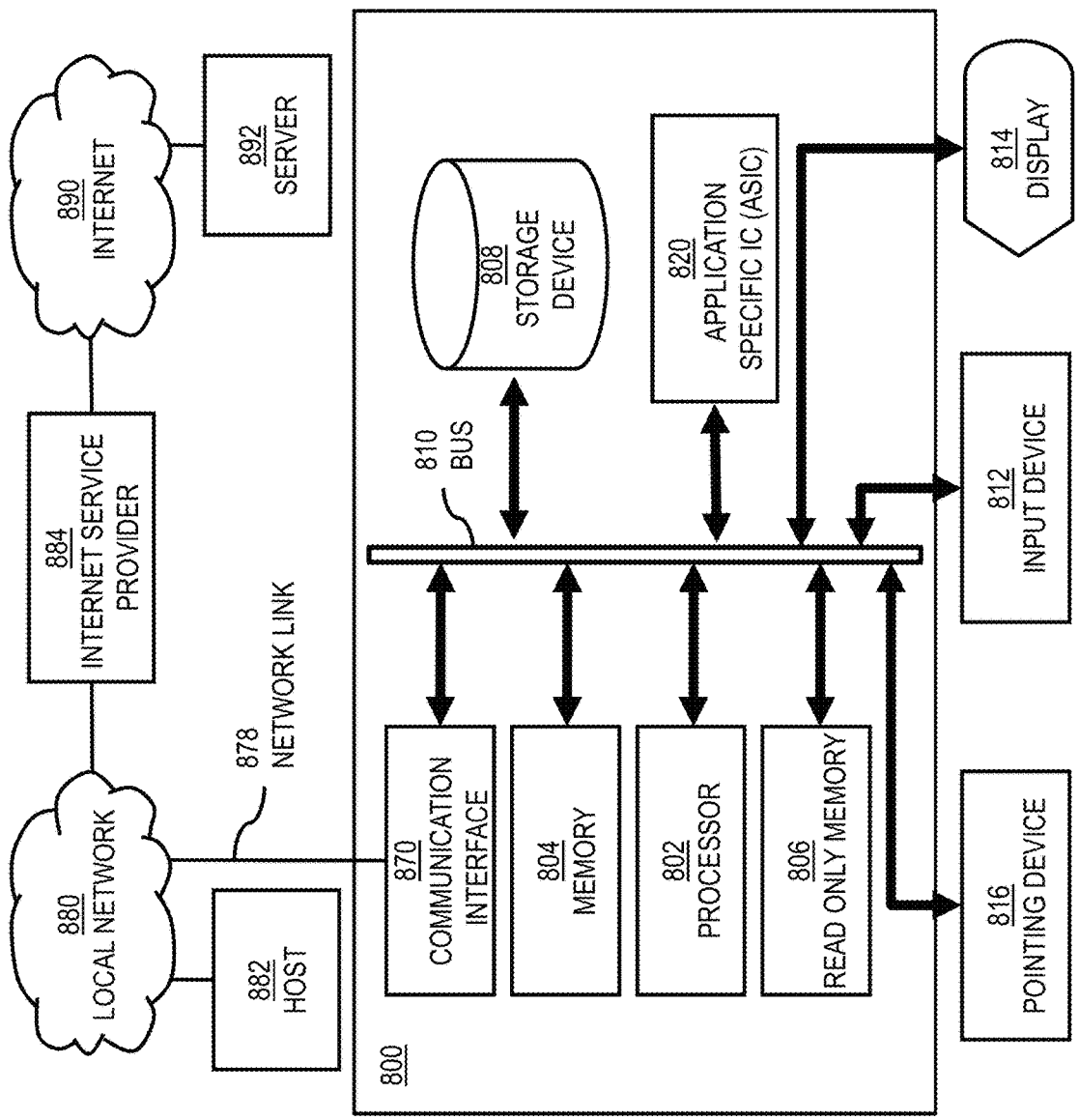
FIG. 8 is a diagram of hardware that can be used to implement an embodiment of the invention.

FIG. 8 illustrates a computer system 800 upon which an embodiment of the invention may be implemented. Computer system 800 is programmed (e.g., via computer program code or instructions) to provide mock map data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing mock map data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing mock map data. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing mock map data, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for providing mock map data to the map client 105.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to provide mock map data as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide mock map data. The memory 905 also stores the data associated with or generated by the execution of the inventive steps.

Figure 10:
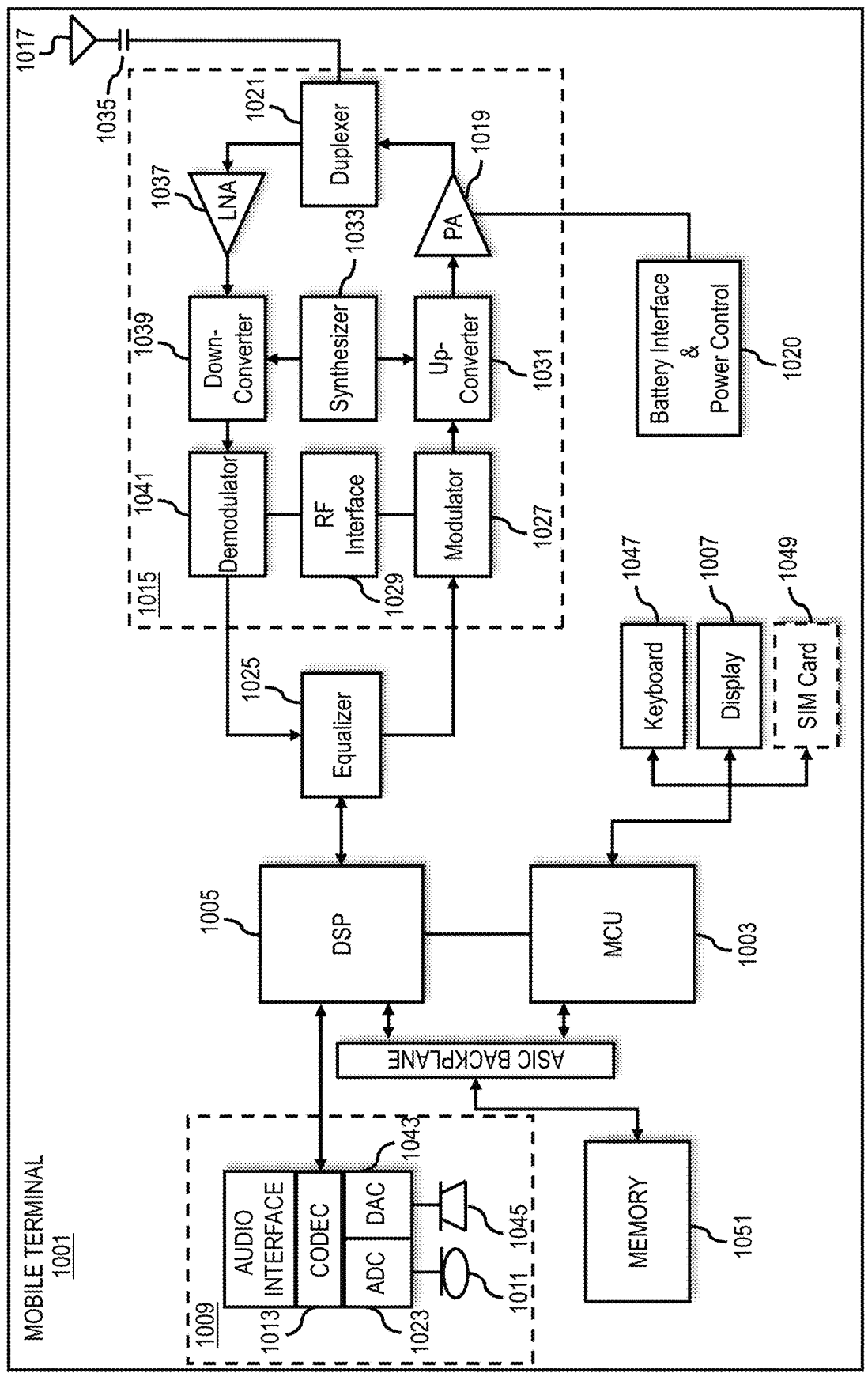
FIG. 10 is a diagram of a mobile terminal (e.g., handset) that can be used to implement an embodiment of the invention.

FIG. 10 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide mock map data. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
receiving, by a mock map data server, an input specifying one or more map feature attributes to generate mock map data, wherein the mock map data are procedurally generated, and wherein procedurally generated comprises using a processor to synthetically generate the mock map data based on the one or more map feature attributes using one or more preconfigured rules, and wherein the input is received via a user interface presented on an input device;
calculating, by the mock map data server, one or more combinations of one or more feature attribute values of the one or more map feature attributes, wherein the one or more feature attributes are one or more types of cartographic features, and wherein the one or more map feature attribute values indicate a size or a class of the one or more types of cartographic features;
creating, by the mock map data server, one or more geometric features respectively for the one or more combinations;
using, by the mock map data server, the one or more preconfigured rules to automatically arrange the one or more geometric features into a pattern that equally spaces the one or more geometric features within a designated geographic area;
procedurally generating, by the mock map data server, the mock map data based on the pattern;
storing, by the mock map data server, the mock map data in a mock map database accessible via the mock map data server, wherein the mock map data is stored in a map data format that is compatible with a real-world map data of a mapping platform that is accessible by a map client; and
modifying, by the mock map data server, a server URL configured in the map client to redirect the map client from the mapping platform to the mock map data server,
wherein the map client receives the mock map data from the mock map data server using the modified server URL and renders the mock map data in a map image on a display device based on a map style taxonomy.

2. The method of claim 1, wherein the mock map data is generated at one or more map zoom levels.

3. The method of claim 1, wherein the map style taxonomy assigns one or more visual attributes respectively to the one or more map feature attributes, the one or more map feature attribute values, the one or more combinations, or a combination thereof, and wherein the one or more visual attributes are rendered in the map image to represent the one or more map feature attributes, the one or more map feature attribute values, the one or more combinations, or a combination thereof.

4. The method of claim 1, further comprising: providing the rendered map image as an output that visually documents the map style taxonomy.

5. The method of claim 1, wherein the pattern arranges the one or more geometric features into at least one of a point grid, a horizontal line, a vertical line, a horizontal strip, a vertical strip, a rectangle grid, and a concentric circular grid.

6. The method of claim 1, wherein the pattern arranges the one or more geometric features into an intersecting arrangement of the one or more map feature attributes, the one or more attribute values, or a combination.

7. The method of claim 1, wherein the mock map data is generated in a vector tile format.

8. The method of claim 1, wherein the pattern is determined based on a specified feature density, a specified feature gap distance, or a combination thereof between the one or more geometric features.

9. The method of claim 1, wherein the one or more map feature attributes, the one or more map feature attribute values, or a combination thereof are not currently represented in the real-world map data.

10. An apparatus comprising:
at least one processor; and at least one memory including computer program code for one or more programs, the at least one memory and the computer program code configured to, with the at least one processor, cause the apparatus to perform at least the following,
receive, by a mock map data server, an input specifying one or more map feature attributes to generate mock map data, wherein the mock map data are procedurally generated, wherein procedurally generated comprises using the at least one processor to synthetically generate the mock map data based on the one or more map feature attributes using one or more preconfigured rules, and wherein the input is received via a user interface presented on an input device;
calculate, by the mock map data server, one or more combinations of one or more feature attribute values of the one or more map feature attributes, wherein the one or more feature attributes are one or more types of cartographic features, and wherein the one or more map feature attribute values indicate a size or a class of the one or more types of cartographic features;
create, by the mock map data server, one or more geometric features respectively for the one or more combinations;
use, by the mock map data server, the one or more preconfigured rules to automatically arrange the one or more geometric features into a pattern that equally spaces the one or more geometric features within a designated geographic area;
procedurally generate, by the mock map data server, the mock map data based on the pattern;
store, by the mock map data server, the mock map data in a mock map database accessible via a mock map data server, wherein the mock map data is stored in a map data format that is compatible with a real-world map data of a mapping platform that is accessible by a map client; and modify, by the mock map data server, a server URL configured in the map client to redirect the map client from the mapping platform to the mock map data server, wherein the map client receives the mock map data from the mock map data server using the modified server URL and renders the mock map data in a map image on a display device based on a map style taxonomy.

11. The apparatus of claim 10, wherein the mock map data is generated at one or more map zoom levels.

12. The apparatus of claim 10, wherein the map style taxonomy assigns one or more visual attributes respectively to the one or more map feature attributes, the one or more map feature attribute values, the one or more combinations, or a combination thereof, and wherein the one or more visual attributes are rendered in the map image to represent the one or more map feature attributes, the one or more map feature attribute values, the one or more combinations, or a combination thereof.

13. The apparatus of claim 10, wherein the apparatus further caused to: provide the rendered map image as an output that visually documents the map style taxonomy.

14. A non-transitory computer readable storage medium carrying one or more sequences of one or more instructions which, when the one or more instructions are executed by one or more processors, cause an apparatus to perform:

receiving, by a mock map data server, an input specifying one or more map feature attributes to generate mock map data, wherein the mock map data are procedurally generated, wherein procedurally generated comprises using the one or more processors to synthetically generate the mock map data based on the one or more map feature attributes using one or more preconfigured rules, and wherein the input is received via a user interface presented on an input device;

calculating, by the mock map data server, one or more combinations of one or more feature attribute values of the one or more map feature attributes, wherein the one or more feature attributes are one or more types of cartographic features, and wherein the one or more map feature attribute values indicate a size or a class of the one or more types of cartographic features;

creating, by the mock map data server, one or more geometric features respectively for the one or more combinations;

using, by the mock map data server, the one or more preconfigured rules to automatically arrange the one or more geometric features into a pattern that equally spaces the one or more geometric features within a designated geographic area;

procedurally generating, by the mock map data server, the mock map data based on the pattern;

storing, by the mock map data server, the mock map data in a mock map database accessible via the mock map data server, wherein the mock map data is stored in a map data format that is compatible with a real-world map data of a mapping platform that is accessible by a map client; and modifying, by the mock map data server, a server URL configured in the map client to redirect the map client from the mapping platform to the mock map data server, wherein the map client receives the mock map data from the mock map data server using the modified server URL and renders the mock map data in a map image on a display device based on a map style taxonomy.

15. The non-transitory computer readable storage medium of claim 14, wherein the mock map data is generated at one or more map zoom levels.

16. The non-transitory computer readable storage medium of claim 14, wherein the map style taxonomy assigns one or more visual attributes respectively to the one or more map feature attributes, the one or more map feature attribute values, the one or more combinations, or a combination thereof, and wherein the one or more visual attributes are rendered in the map image to represent the one or more map feature attributes, the one or more map feature attribute values, the one or more combinations, or a combination thereof.

17. The non-transitory computer readable storage medium of claim 14, wherein the apparatus is caused to further perform:

providing the rendered map image as an output that visually documents the map style taxonomy.

18. The non-transitory computer readable storage medium of claim 14, wherein the pattern arranges the one or more geometric features into at least one of a point grid, a horizontal line, a vertical line, a horizontal strip, a vertical strip, and a rectangle grid.

19. The method of claim 1, wherein the pattern arranges the one or more geometric features into an intersecting arrangement of the one or more map features, the one or more attribute values, or a combination thereof; and wherein the intersecting arrangement arranges the one or more map features along vertical lines, horizontal lines, and/or concentric circular lines.

* * * * *